United States Patent
Chhabra et al.

(10) Patent No.: US 11,360,910 B2
(45) Date of Patent: Jun. 14, 2022

(54) PREVENTION OF TRUST DOMAIN ACCESS USING MEMORY OWNERSHIP BITS IN RELATION TO CACHE LINES

(71) Applicant: Intel Corporation, Santa Clara, CA (US)

(72) Inventors: Siddhartha Chhabra, Portland, OR (US); Vedvyas Shanbhogue, Austin, TX (US); Ravi L. Sahita, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 94 days.

(21) Appl. No.: 16/456,718

(22) Filed: Jun. 28, 2019

(65) Prior Publication Data

US 2021/0064547 A1    Mar. 4, 2021

(51) Int. Cl.
| | |
|---|---|
| *G06F 12/14* | (2006.01) |
| *G06F 11/10* | (2006.01) |
| *G06F 12/0802* | (2016.01) |
| *H04L 9/06* | (2006.01) |

(52) U.S. Cl.
CPC ...... *G06F 12/1408* (2013.01); *G06F 11/1068* (2013.01); *G06F 12/0802* (2013.01); *G06F 12/1458* (2013.01); *H04L 9/0643* (2013.01)

(58) Field of Classification Search
CPC .. G06F 21/78; G06F 21/79; G06F 2212/1052; G06F 12/1408
See application file for complete search history.

(56) References Cited

U.S. PATENT DOCUMENTS

| | | | | |
|---|---|---|---|---|
| 2003/0061006 | A1* | 3/2003 | Richards | G06Q 30/02 |
| | | | | 702/182 |
| 2005/0188173 | A1* | 8/2005 | Hasbun | G06F 12/1466 |
| | | | | 711/203 |
| 2010/0082940 | A1* | 4/2010 | Nito | G06F 12/084 |
| | | | | 712/28 |
| 2015/0248568 | A1* | 9/2015 | Offenberg | G06F 21/78 |
| | | | | 713/193 |
| 2016/0344731 | A1* | 11/2016 | Serebrin | H04L 63/062 |
| 2017/0285976 | A1* | 10/2017 | Durham | G06F 12/1408 |
| 2018/0048470 | A1 | 2/2018 | Bower et al. | |
| 2019/0042402 | A1 | 2/2019 | Chhabra et al. | |
| 2019/0050283 | A1 | 2/2019 | Durham et al. | |
| 2020/0036704 | A1* | 1/2020 | Chu | H04L 65/1033 |

OTHER PUBLICATIONS

European Search Report and Search Opinion, EP App. No. 20164111.5, dated Jun. 30, 2020, 9 pages.

* cited by examiner

*Primary Examiner* — Nanci N Wong
(74) *Attorney, Agent, or Firm* — Nicholson De Vos Webster & Elliott LLP

(57) ABSTRACT

A processor includes a processor core and a memory controller coupled to the processor core. The memory controller comprising a cryptographic engine to: detect, in a write request for a cache line, a key identifier (ID) within a physical address of a location in memory; determine that the key ID is a trust domain key ID of a plurality of key IDs; responsive to a determination that the key ID is the trust domain key ID, set an ownership bit of the cache line to indicate the cache line belongs to a trust domain; encrypt the cache line to generate encrypted data; determine a message authentication code (MAC) associated with the cache line; and write the encrypted data, the ownership bit, and the MAC of the cache line to the memory.

20 Claims, 17 Drawing Sheets

Key Encryption Table — 122

| KeyID | Key           255 | Poison? 260 |
|-------|-------------------|-------------|
| 0     | 128-bit (TME)     | 0           |
| 1     | 128-bit (MKTME)   | 0           |
| ...   | ...               | ...         |
| 31    | 128-bit (MKTME)   | 0           |
| 32    | 128-bit (TDX)     | 0           |
| 33    | 128-bit (TDX)     | 0           |
| 34    | 128-bit (TDX)     | 1           |
| ...   | ...               | ...         |
| 126   | 128-bit (TDX)     | 1           |
| 127   | 128-bit (TDX)     | 0           |

Key Ownership Table — 124

| KeyID | Ownership Status |
|-------|------------------|
| 0     | Hypervisor root  |
| 1     | Hypervisor       |
| ...   | ...              |
| 31    | Hypervisor       |
| 32    | TD 1             |
| 33    | TD 2             |
| 34    | TD 1             |
| ...   | ...              |
| 126   | TD 3             |
| 127   | Unassigned       |

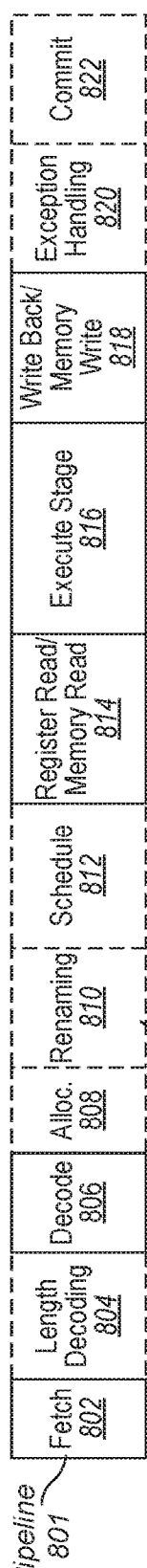
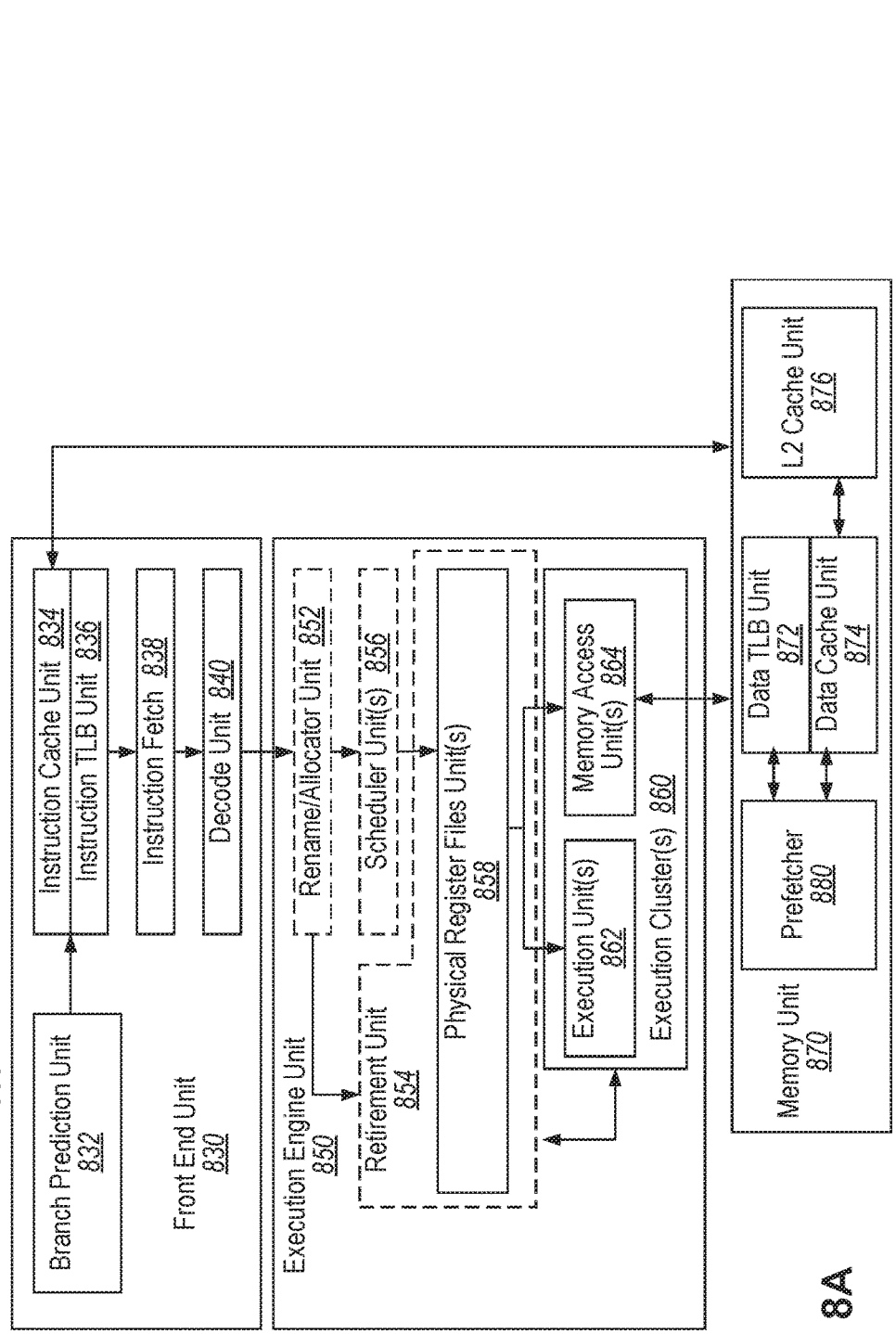
FIG. 8B
FIG. 8A

PREVENTION OF TRUST DOMAIN ACCESS USING MEMORY OWNERSHIP BITS IN RELATION TO CACHE LINES

TECHNICAL FIELD

The disclosure pertains to computer systems, more specifically, to prevention of trust domain access using memory ownership bits in relation to cache lines.

BACKGROUND

Modern computing systems employ disk encryption to protect data stored at rest on hard drive disks or other data storage. Attackers, however, can use a variety of techniques including bus scanning, memory scanning, and the like, to retrieve data from memory. The memory may itself include the keys used for disk encryption, thus exposing the data encrypted on a disk drive. Even if data stored in memory is first encrypted, access to encrypted data still allows for various types of replay attacks. Various techniques, therefore, have been employed to protect sensitive data residing in at least some regions of memory. Doing so has become challenging, particularly in a cloud or server environment where multiple customer workloads (from different entities) may be supported simultaneously on the same server. Requirements to sufficiently secure data of the different entities has extended to protection against replay attacks as well.

BRIEF DESCRIPTION OF THE DRAWINGS

FIG. 2C is an illustration of a micro-architectural key encryption table indexed by key ID and storing associations of key IDs to encryption keys, according to one implementation.

FIG. 2D is an illustration of a micro-architectural key ownership table indexed by key ID and storing allocations of key IDs to various trust domains, according to one implementation.

FIG. 8A is a block diagram illustrating a micro-architecture for a processor in which one implementation of the disclosure may be used.

FIG. 8B is a block diagram illustrating an in-order pipeline and a register renaming stage, out-of-order issue/execution pipeline implemented according to at least one implementation of the disclosure.

DETAILED DESCRIPTION

Figure 1A:
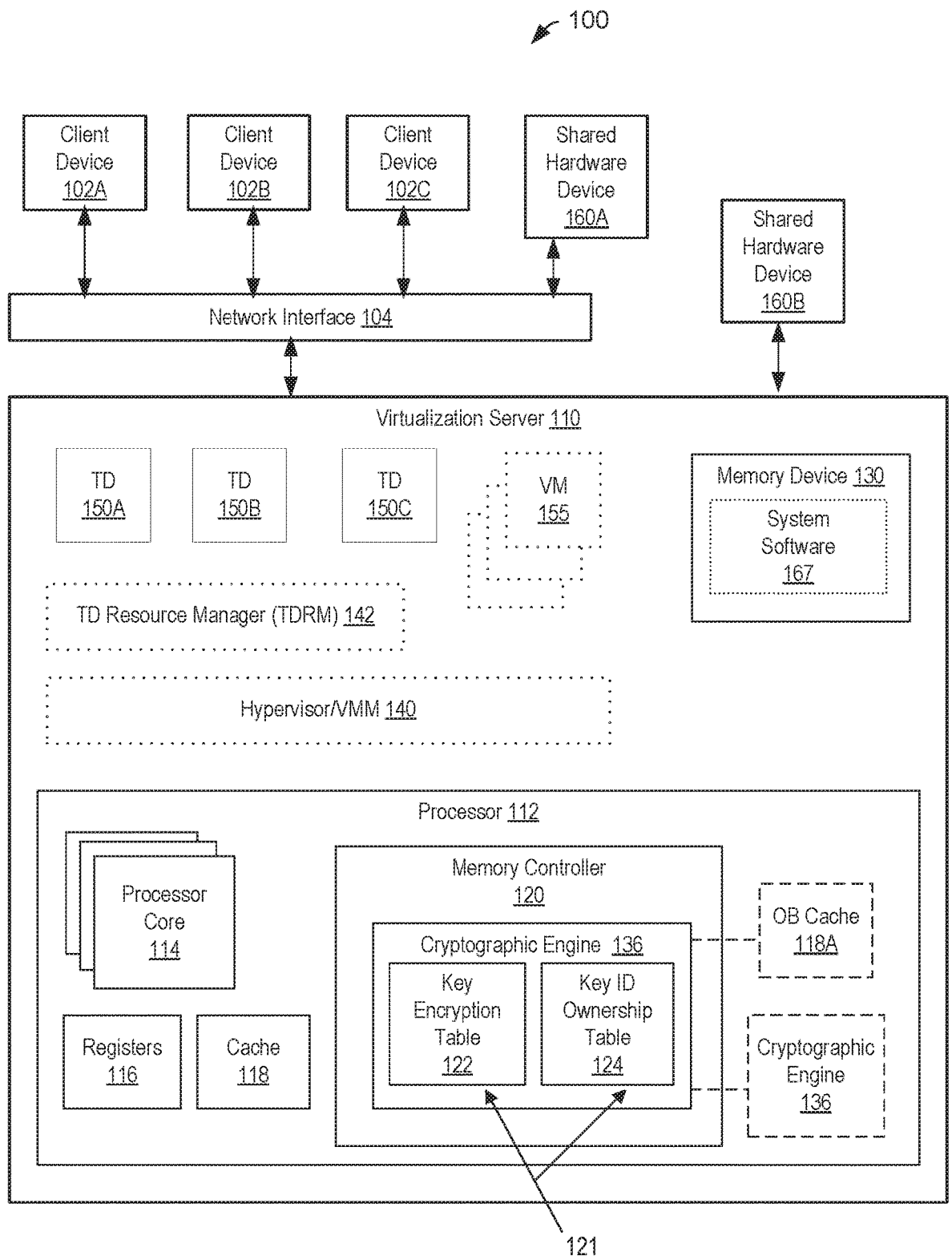
FIG. 1A is a block diagram illustrating an example computing system that enables coexistence of trust domain (TD) architecture with multi-key, total memory encryption (MK-TME) technology in virtualized systems, according to one implementation.

Aspects of the disclosure are directed to a memory controller of a processor that can tag cache lines stored in system memory with an ownership bit. The ownership bit, which may be included within metadata associated with the cache line, indicates whether or not the cache line belongs to a trust domain (TD). The ownership bit may be set upon write of the cache line in response to a determination that a key identifier (ID) located within a physical address of a write request belongs to a TD. Upon performing a read of the cache line, the access type of the key ID (e.g., whether or not is a TD key ID) in a read request is checked against a value of the ownership bit. If there is a mismatch, the memory controller may return, in response to the read request, a poison bit and invalid data that matches a fixed pattern (e.g., all zeros or all ones). In this way, an attacker does not get access to the encrypted data for the TD stored in the cache line. Although implementations of the disclosure may relate to customers of cloud service providers (CSPs), the trust domain may also be any container (e.g., virtual machine), operating system, or device that is treated with heightened security compared to another container, operating system, or device available on the same platform.

Cloud server computing and virtual computing environments provide remote computing resources and remote data storage resources for various devices. Remote computing and data storage make it especially important to protect data from access by unauthorized persons and malicious software. One way to protect data in memory is with Total Memory Encryption (TME) technology, in which memory accesses by software executing on a processor core may be encrypted with an encryption key. For example, when the processor makes a write request to memory, the data may be encrypted by a memory encryption engine (or other cryptographic engine) before being written to cache lines of the memory. When the data is read from memory, the data is sent to the processor in encrypted form. Once the data has reached the processor, the memory encryption engine may decrypt the data with the encryption key. Because data remains in the processor in the form of plaintext, the TME technology does not require modification to the existing software and how the existing software interacts with the processor.

In various implementations, the added security provided by use of cache line-based ownership bits is provided in the context of a TD infrastructure that functions with multi-key total memory encryption (MK-TME) technology. The MK-TME technology is an extension of TME technology that provides support for multiple encryptions keys, allowing for compartmentalized memory encryption. For example, MK-TME technology provides an operating system (or a hypervisor, also called a virtual machine monitor (VMM), in a virtual computing environment) use of different encryption keys to encrypt pages of physical memory associated with different clients/applications. These clients/applications are generally referred to herein as virtual machines (VMs), one of which may be the hypervisor, although the clients/applications may be another type in different implementations. A TD infrastructure refers to allowing some VMs (referred to as TDs) to execute within highly-secured environments where even the operating system (or the hypervisor) may not have access to physical memory pages that belong to the TDs. The multi-key extension is particularly suited to work with multi-domain architectures, such as used by CSPs, because the number of supported keys may be implementation-dependent. In some implementations, the MK-TME technology includes integrity protection, e.g., via message authentication code (MAC) verification, and thus sometimes is referred to as MK-TMEi technology.

In the TD extensions (TDX) architecture, there can be multiple secure TDs corresponding to different client machines (e.g., VMs), guest operating systems, host operating systems, hypervisors (e.g., VMMs), and the like. Additionally, even different applications run by the same client within the same guest operating system may be executed securely. To ensure scalability of the secure computing when multiple TDs are present, each TD may use one or more private keys that are not available to software operating outside the TD. In some instances, software executing in one secure domain may have access to private keys specific to that particular domain and to shared keys that may be used by multiple domains. For example, a software running inside a secure domain can use a private key for its secure execution, such as read, write, or run operations. On the other hand, the same software can use a shared key to access structures or devices that are shared with other domains, such as a printer, a keyboard, a mouse, a monitor, a network adapter, a router, and the like.

While the cryptographic mechanisms implemented in an MK-TME engine are utilized to provide confidentiality and integrity to TD data, they are not sufficient to protect against all attacks. More specifically, untrusted software (e.g., CSP software) with access to TD ciphertext data can compromise the confidentiality and/or integrity of data, both through speculative and non-speculative means. These attacks are generally referred to as replay attacks, such as providing ciphertext data for a counter that tracks unsuccessful login attempts, to reset the counter and enable unlimited brute force attempts at cracking a password. In setting up a replay attack, an attacker can generate a dictionary of memory addresses indexed to ciphertext data, and then use this dictionary to later store the ciphertext to a particular memory location. Accordingly, implementations of the disclosure prevent such attacks by preventing access to the ciphertext (or encrypted) data by any non-TD agent, which in turn may prevent the replay attacks.

In one implementation, a processor includes a processor core and a memory controller coupled to the processor core. The memory controller includes a cryptographic engine (such as an MK-TME engine) to detect, within a write request for a cache line, a key ID within a physical address of a location in memory. The cryptographic engine may further determine that the key ID is a trust domain key ID of a plurality of key IDs, and thus set an ownership bit of the cache line to indicate the cache line belongs to a trust domain. The cryptographic engine may further encrypt the cache line to generate encrypted data and determine a MAC associated with the cache line. The cryptographic engine may further write the encrypted data, the ownership bit, and the MAC of the cache line to the memory. This may conclude a write that includes updating the ownership bit.

In an additional or alternative implementation, a system includes a memory device to store cache lines and associated ownership bits, a processor core, and a memory controller coupled between the memory device and the processor core. The memory controller may include a cryptographic engine to detect, within a read request for a cache line from the processor core (or other system agent), a key ID within a physical address of a location in the memory. The cryptographic engine may further determine that the key ID is a trust domain key ID of a plurality of key IDs, read the cache line from the memory device, and determine whether an ownership bit, stored in the memory device for the cache line, is set to indicate the cache line belongs to a trust domain. If the ownership bit indicates the cache line belongs to a TD, the memory controller may continue with decryption of encrypted data stored at the cache line, verifying integrity via a MAC check, and returning unencrypted data assuming the integrity check passes. Otherwise, if the ownership bit does not indicate the cache line belongs to a TD, the memory controller may return, in response to the read request, a poison bit and invalid data that matches a fixed pattern.

In implementations, the use of an ownership bit related to cache lines in the memory provide a number of advantages. One advantage is to prevent the above-mentioned replay attacks where an attacker can use encrypted data to replay at a later time in order to break security mechanisms, including cracking passwords or brute force determination of a MAC in order to pass integrity checks. Another advantage is avoiding use of range registers, at boot of the disclosed system (e.g., a virtualization server), for reserving a large amount of system memory dedicated to exclusive use by the TDX architecture. More specifically, a range register-based solution would require most of the system memory to be reserved up front for TDX usage, making the system unusable for other non-secure usages, including for the VMM itself. Inflexible reservation of so much system memory makes the range register solution impractical for implementation. By enabling flexible use of any amount of the system memory depending on customer (e.g., CSP tenant) workloads, use of the ownership bits with cache lines in memory provides similar exclusion to access by any non-TD agent.

FIG. 1A illustrates an example computing system 100 that enables coexistence of TDX and MK-TMEi technologies on a virtualization server 110 supporting multiple client devices 102A, 102B, and 102C. The computing system 100 may further include a network interface 104 and shared hardware devices 160A and 160B. The virtualization server 110 may include, but not be limited to, a processor 112, memory device 130, and one or more TDs 150A, 150B, and 150C. The processor 112 may execute a virtual machine monitor (VMM) or hypervisor 140, a TD Resource Manager (TDRM) 142, which in turn may run one or more virtual machines (VMs) 155. In various implementations, the processor 112 may include one or more processor cores 114, one or more registers 116 (e.g., hardware registers), cache 118, ownership bit (OB) cache 118A, and a memory controller 120, e.g., a memory management unit.

In one implementation, the memory controller 120 in turn includes a cryptographic engine 136 (such as an MK-TME engine in one implementation) having one or more key data structure 121 in which to store a key encryption table (KET) 122 and a key ownership table (KOT) 124, which are discussed in more detail with reference to FIGS. 2C-2D. In another implementation, the cryptographic engine 136 is located in the uncore outside of the memory controller 120, yet coupled to the memory controller 120, as illustrated in dashed lines (as optional). The OB cache 118A may be on-die cache for use by the cryptographic engine 136 to cache ownership bits from a sequestered range of the memory device 130, as will be discussed with reference to FIG. 4. In implementations, the memory device 130 is any of dynamic random access memory (DRAM), synchronous DRAM (SDRAM), a static memory, such as static random access memory (SRAM), a flash memory, a data storage device, or a combination of such memory devices. For brevity, the memory device 130 is also simply referred to as memory 130.

In one implementation, the virtualization server 110 is a CSP host server running virtualization architecture, which runs both the MK-TME technology and the TDX architecture for efficient execution of client/tenant applications. For example, the host server may execute highly sensitive applications within TDs so that the hypervisor 140 does not have access to the memory pages and encryption keys allocated to a TD and the TD's trusted computing base (TCB). At the same time, the virtualization server 110 may run applications that demand less security and isolation using the MK-TME technology where the hypervisor 140 retains control over memory pages and encryption keys used in these less sensitive applications. The hypervisor 140 may then isolate different applications from each other using different MK-TME keys, but still remain in the TCB of each application.

Each client device 102A, 102B, 102C may be a remote desktop computer, a tablet, a smartphone, another server, a thin/lean client, and the like. Each client device may execute applications on the virtualization server 110 in one or more of the TDs 150A, 150B, and 150C and one or more VMs 155, where the VMs run outside the TCB of each respective TD. A hypervisor 140 may execute a virtual machine environment where the hypervisor leverages hardware capabilities of a host and is to execute one or more guest operating systems, which support client applications that are run from separate client devices 102A, 102B, and 102C. A single TD, such as the TD 150A, may provide secure execution environment to a single client 102A and support a single guest OS, in one implementation. In another implementation, one TD may support multiple tenants each running a separate virtual machine and facilitated by a tenant virtual machine monitor (tenant VMM) running inside the TD. The tenant VMM (not explicitly illustrated in FIG. 1) may communicate with the hypervisor (host VMM) 140 to access the memory 130 and the processor 112. The execution state of the TDs 150A-C may be further enabled by the TDRM 142. The TDRM 142 may be an extension of the hypervisor 140 or as a separate resource that is supported by the hypervisor 140.

In implementation, the TDRM 142 and hypervisor 140 act as a host for TDs and control access of TDs to the processor 112 and other system hardware. The processor 112 may have one or multiple processor cores 114, hardware registers 116, and cache 118. The memory controller 120 may control memory operation, to include use of the cryptographic engine 136 to encrypt data being written to memory and decrypt data being read from memory with appropriate encryption keys. The processor 112 may have the capability to enter a TDX mode where TDX instructions are loaded into hardware registers 116 (such as control registers or model-specific registers) of the processor 112 to facilitate isolation of memory from any software that does not belong to the TCB of the TD. The TDRM 142 may enter into and exit the TDX mode. The TDRM 142 may act as a host and have control of the processor and other platform hardware. A TDRM 142 may assign software in a TD (e.g. TD 150A) with logical processor(s), but may not access a TD's execution state on the assigned logical processor(s). Similarly, the TDRM 142 may assign physical memory and I/O resources to a TD but not be privy to access/spoof the memory state of a TD due to separate encryption keys, and other integrity/replay controls on memory.

A TD represents a software environment that may support a software stack that includes VMMs, guest operating systems, and various application software hosted by the guest OS(s). Each TD may operate independently of other TDs and use logical processor(s), memory, and I/O assigned by the TDRM. Software executing in a TD may operate with reduced privileges so that the TDRM may retain control of the platform resources. On the other hand, TDRM cannot access data associated with a TD or in some other way affect the confidentiality or integrity of a TD.

The TDRM 142 (or a hypervisor portion of the TDRM) may perform management of the encryption keys. For example, the TDRM may assign different keys to different TDs, configure keys on the memory encryption engines, call for the execution of cache flush when keys are to be reassigned to different TDs, and the like. In implementations of the disclosure, the TDRM 142 in the TD architecture acts as a host for the TDs and has full control of the cores and other platform hardware. A TDRM 142 assigns software in a TD with logical processor(s). The TDRM 142, however, may not have access to a TD's execution state on the assigned logical processor(s). Similarly, a TDRM 142 assigns physical memory and I/O resources to the TDs, but may not be privy to access the memory state of a TD due to the use of separate encryption keys enforced by the processor per TD, and other integrity and replay controls on memory. Software executing in a TD operates with reduced privileges so that the TDRM 142 may retain control of platform resources. However the TDRM 142 may not be allowed to compromise the confidentiality or integrity of the TD by gaining access to the TD's trusted computing base.

To further improve security of data in TDs, the TDX architecture may employ K encryption keys that are securely generated. In one implementation, the TDRM 142 may cause the processor 112 (for example, using instruction TDCREATE) to generate an ephemeral memory encryption key and a corresponding key identifier (ID) for each TD. The encryption keys (e.g., K encryption keys) may be identified to software running on the processor by unique key IDs. In one implementation, a key ID for a TD may be appended to the physical memory addresses associated with that TD. The basic input/output system (BIOS) (or other startup firmware), during start up, may allocate a range of bits within the physical memory addresses for a particular number of key IDs. For example, the BIOS may store a range of bits in the hardware register 116, such as a model-specific register (MSR) in one implementation. After boot, the computing system 100 may retrieve the range of bits from the MSR and employ those bits to encode the key IDs within the physical memory addresses.

In various implementations, each key ID could be any number having a binary representation. For example, a range of K consecutive numbers, beginning from 0 and ending with K−1, may be used in one implementation. In another implementation, the range of the numbers used for representations of encryption key IDs may start from a different number. The range need not be contiguous in some implementations. A binary encoding of the encryption key IDs may include M bits wherein M may be an integer such that M≥log$_2$K, to ensure that the total number $2^M$ of various combinations of M bits is not less than the number K of different encryption keys.

Physical pages of the memory 130 may be encrypted with one of the encryption keys. As discussed, the key ID indicating the encryption key used for memory encryption may be added to the physical memory address of the physical page of the memory, e.g., physical memory of the host server, which will be explained in more detail below. With the key IDs appended to the physical memory addresses, a memory operation requested by software may fail unless the memory operation request includes both the physical memory address of the page and the correct key ID for the encryption key used to encrypt/decrypt the physical page of the memory. The memory operation may be a "read," "write," or "execute" operation involving the physical page of the memory, which may relate to cache line in the memory 130.

The concatenation of the restricted key ID to the physical memory addresses of the physical memory allocated to the TD for private use may prevent unauthorized or unsecured accesses to such memory. In order to maintain hardware isolation of restricted encryption keys from non-restricted encryption keys, the processor 112 may need to enable partition of key IDs into restricted TD key IDs (e.g., allocated to TDX) and non-restricted MK-TME key IDs (e.g., allocated to the hypervisor, TDRM, OS, or other software outside the TCB of TDs) and maintain this partition during the execution of the TDX architecture in one or more data structures (such as micro-architectural tables, for example) stored inside the processor. In some implementations, boot up software or firmware (e.g., BIOS) may set up such a partition and store an identification of the partition in one of the hardware registers 116 of the processor 112 that may be software accessible after boot of the computing system 100. This allows the system to run both the TD architecture and the MK-TME technology within the host server to enable highly secure virtual machines running inside TDs as well as unmodified VMs protected by the MK-TME mechanisms.

To maintain isolation from software (such as the hypervisor 140), the partition of key IDs into restricted and non-restricted may be static, in one implementation. If, during post-boot execution, it is determined that a different partition of key IDs may be optimal, a post-boot software (e.g., the hypervisor 140) may request key ID repartitioning. This may be advantageous, for example, if the number of applications requiring highly-secure execution has increased. In some implementations, this may be done by the post-boot software initiating a handshake mechanism with the boot-up firmware/software requesting modification of the key ID partition. Upon completion of the handshake and determining the new desired partition of key ID space, the TDRM 142 may save a state of execution of TDs currently running on the processor using the key IDs and perform a system reboot. This may provide flexibility to define partition of key IDs between MK-TME and TDX based on the workload and the current state of the computing system.

The hypervisor 140 may assign logical processors, physical memory, encryption key IDs, I/O devices, and the like to TDs, but may not access the execution state of TDs and/or data stored in physical memory assigned to TDs. The processor 112 may utilize the cryptographic engine 136 to use restricted encryption keys to facilitate secure data storage and handling. For example, the cryptographic engine 136 may encrypt data before moving it from one or more registers 116 or cache 118 to the memory 130 upon executing a "write" code. Conversely, the cryptographic engine 136 may decrypt data when the data is moved from the memory 130 to the processor 112 following a "read" or "execute" command.

Each processor core 114 of the processor 112 may support one or more hardware threads corresponding to logical processors. The logical processors supported by the processor cores 114 may be assigned to the TDs 150A-C by the TDRM 142 in some implementations. In addition to the TDX-based implementation of client virtual machines, the virtualization server 110 may execute one or more VMs 155 outside TDs for one or more client devices 102A-C. Whereas software outside trust computing base of the TDs—such as the TDRM 142 and hypervisor 140—may not have access to physical memory pages allocated to TDs and/or execution state of TDs, the virtual machines operating outside TDs may not be secure against accesses by the hypervisor 140. Nonetheless, the virtual machines operating outside the TCB of each TD may still be secure from software accesses originating from TDs or other virtual machines. In some implementations, such access may prevented by the cryptographic engine 136 encrypting data moving between the processor 112 and the memory 130 with one or more non-restricted encryption keys. The term "non-restricted" is meant to refer to a key accessible to the hypervisor 140. On the other hand, the unauthorized TDs and VMs may be prohibited from using such keys for memory operations, in some implementations.

Additionally, in at least some implementations, one or more of the non-restricted keys may be shared. Shared keys may be accessible by two or more entities, such as TDs and VMs running outside the TDX environment. Shared keys may be used to access one or more shared structures, such as shared hardware devices 160A and 160B, which may be a printer, a keyboard, a mouse, a monitor, a network adapter, a router, and the like. For example, to print an image or a text page, a software operating in a TD 150A may need to encrypt data with a shared key and store the encrypted data in memory 130 before transmitting the data to a shared hardware device. A shared hardware device 160A may be connected to the virtualization server 110 via a network interface 104, in one implementation. In another implementation, a shared hardware device may be local to the virtualization server 110, as illustrated, for example by the shared hardware device 160B.

The memory controller 120 to control data exchanges between the processor core(s) 114, registers 116, cache 118, and memory 130. In some implementations, the KET 122 is used to store encryption keys and key IDs of the encryption keys and the KOT 124 is used to store allocations of the key IDs to TDs. The memory controller 120 may also be coupled to the VMs, which run outside the TDX architecture.

Figure 1B:
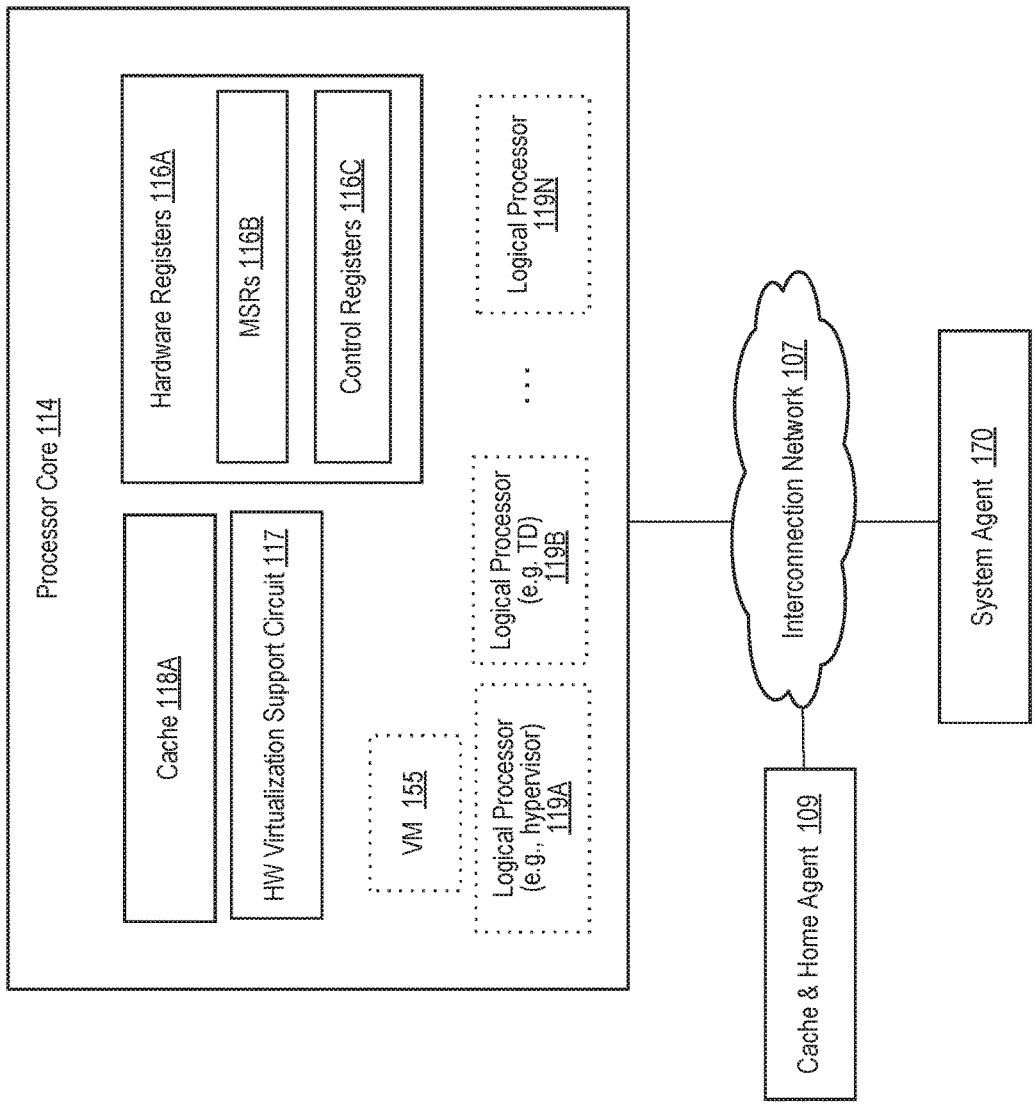
FIG. 1B is block diagram illustrating an example processor core of a processor of the computing system that enables coexistence of TD architecture with MK-TME technology, according to one implementation.

FIG. 1B is block diagram illustrating an example processor core of a processor of a computing system that enables coexistence of TD architecture with MK-TME technology, according to one implementation. In the implementation illustrated in FIG. 1B, each processor core 114 may include cache 118A, a hardware virtualization support circuit 117, and hardware registers 116A. Each processor core 102 may communicate via an interconnection network 107 on a multi-core processor package with a corresponding cache and home agent (CHA) 109 and with one or more system agents 170 that exist off the multi-core processor package. The CHA 109 may cache a copy of a cache line of memory that is homed in (e.g., local to) that memory at a cache line granularity. In different implementations, the interconnection network 107 is a Peripheral Component Interconnect (PCI™) bus, such as the Peripheral Component Interconnect express (PCIe™) bus, or another custom bus. The system agents 170 may include disk storage, device drivers, I/O devices or the like.

The processor core 114 may execute instructions to run a number of hardware threads, also known as logical processors, including the first logical processor 119A, a second logical processor 119B, and so forth until an Nth logical processor 119n. In one implementation, the first logical processor 119A is a virtual machine monitor (VMM) or hypervisor. A number of virtual machines (VMs) 155 may be executed and controlled by the VMM. Additionally, as discussed, the VMM may assign key IDs, which are associated with corresponding encryption keys, to various secure domains (e.g., VMM, VMs) operating on the computing system 100.

With further reference to FIG. 1B, the hardware registers 116A may include, for example, a number of general purposes registers (not illustrated, e.g., EAX, EBX, ECX, EDX, and the like), model-specific registers 116B (or MSRs), and control registers 116C (e.g., CR1, CR2, CR3, and the like). In one implementation, the computing system 100 is a server that services the domains, e.g., different workloads such as a client machine, an operating system, an application, or other types of workloads being supported.

With additional reference to FIG. 1A, and in various implementations, the cryptographic engine 136 is embodied as a microcontroller, microprocessor, functional block, logic, or other circuit or collection of circuits capable of performing the functions described herein. The cryptographic engine 136 may cache the internal key data structure 121, which the cryptographic engine 136 may use to identify domain accesses to be protected. The key data structure 121 may be a table or other data structure capable of being indexed and stored within hardware of the cryptographic engine 136. In one implementation, the hardware is a cache, a set of registers, or other flash memory.

In various implementations, the key data structure 121 may be controlled and/or programmed by hardware of the cryptographic engine 136 or by trusted software, for example using a crypto engine programming support circuit of the processor 112. The key data structure 121 may be adapted to store keys and domain information for the domains, as will be discussed in more detail with reference to FIGS. 2C-2D. The encryption keys and/or other secret information of the key data structure 121 may not be available to untrusted software, e.g., OS or VMM. In some implementations, the cryptographic engine 136 may be incorporated along with the memory controller 120 and the processor core 114 in a system-on-a-chip (SoC) of the computing system 100.

The encryption keys and key IDs associated with the encryption keys may be enabled by the cryptographic engine 136 configured by BIOS, upon boot of the computing system 100, using a TME activate (TME_ACTIVATE) MSR within the hardware registers 116. To enable MK-TME, TME Enable RWL bit in the TME_ACTIVATE MSR may be set and bits 35:32 may be set to non-zero values that specify the number of key ID bits configured for MK-TME. These MK_TME_KEYID_BITS are the number of key ID bits to allocate to MK-TME. Similar to enumeration, this is an encoded value. Writing a value greater than the enumerated number of maximum supported KeyID bits may result in general protection fault (#GP). Writing a non-zero value to this field results in a general protection fault if bit 1 of EAX (TME Enable) is not also set to '1,' as TME is to be enabled to use MK-TME. The TME_ACTIVATE MSR may also be used to lock other TME-related MSRs (e.g., EXCLUD_MASK, EXCLUDE_BASE), so that any write to the registers after they are locked will be ignored. The lock may be reset when the computing system 100 is reset.

In some implementations, when the computing system 100 is booted, the BIOS may store particular information in the TME_ACTIVATE MSR for later use by the processor 112 (e.g., the memory controller 120) in restricting access to the restricted encryption keys and key IDs. This information may include a value for a number of address bits of physical memory addresses (e.g., host physical addresses) used for key IDs. The particular information stored by BIOS into the TME_ACTIVATE MSR may further include a partition identifier (e.g., a partition key ID) to partition key IDs into non-restricted key IDs and restricted key IDs. Furthermore, in one implementation, a second number of restricted bits of the physical memory addresses may be stored in the TME_ACTIVATE MSR that specifies how the restricted key IDs are partitioned from the non-restricted key IDs.

Figure 2A:
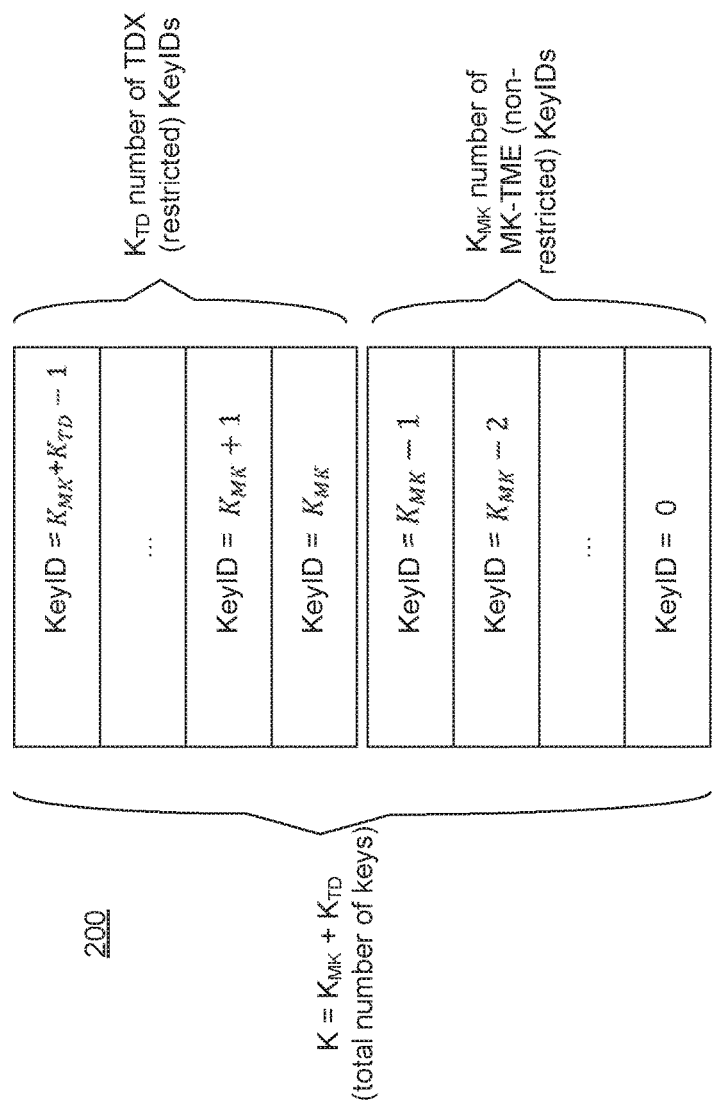
FIG. 2A is a diagram illustrating encryption key identifier (ID) space partitioning into TD and MK-TME key IDs, according to one implementation.

FIG. 2A illustrates encryption key ID space partitioning 200 into TDX and MK-TME key IDs, in one implementation, with a single boundary separating non-restricted key IDs from restricted key IDs. On boot, the processor 112 may store, within an MSR of the registers 116, a bit range for the key ID encoding. The bit range may support K key IDs to identify K encryption keys. The processor 112 may further identify, within the MSR, the space partitioning 200 of the key ID space. In one implementation, K key IDs may be partitioned into $K_{MK}$ non-restricted key IDs and $K_{TD}$ restricted key IDs, so that $K_{MK}+K_{TD}=K$. The non-restricted key IDs may be MK-TME key IDs allocated to the hypervisor 140 (e.g., for allocation to shared devices) in a virtualization implementation illustrated in FIG. 1A. The restricted key IDs may be allocated to the TD infrastructure and then further allocated to one or more TDs 150A-C.

In one implementation, key IDs may be mapped onto a contiguous interval of integer numbers ranging from 0 to K−1. The non-restricted key IDs may map onto the lower set of contiguous numbers ranging from 0 to $K_{MK}-1$, with the restricted key IDs mapping onto the higher set of contiguous number ranging from $K_{MK}$ to K−1. In the implementation illustrated in FIG. 2A, one boundary between restricted and non-restricted key IDs is defined, e.g., residing below the key ID=$K_{MK}$ line. While partitioning the key ID space into two contiguous ranges may be advantageous in some instances, in other implementations multiple boundaries may be defined such that multiple regions of non-restricted key IDs are interspaced with regions of restricted key IDs.

Figure 2B:
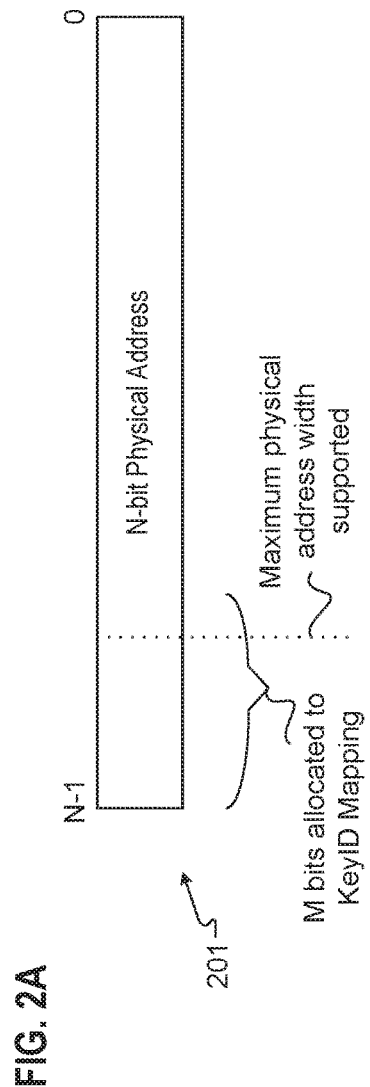
FIG. 2B is a diagram illustrating encryption key ID encoding and partitioning into TDX and MK-TMEi key IDs using M bits of address space concatenated to the physical memory address, according to one implementation.

FIG. 2B is a block diagram of an n-bit physical memory address 201 that includes a portion of the address bits allocated to key IDs according to various implementations.

This portion of address bits may encompass M bits, which may be at least $\text{Log}_2 K$. The dotted line in FIG. 2B illustrates a maximum physical address width that is supported. Accordingly, use of at least some of upper address bits of the physical memory address to encode for key IDs may be advantageous. In other implementations, however, the M bits for the key IDs may be located elsewhere within the physical memory address, including beyond the maximum physical address width.

The number of boundaries may be even greater for other partition implementations. In one implementation, restricted keys may be interspaced with non-restricted key IDs one after another. This may happen, as a way of example, if only the lowest bit of the M bits used for key ID encoding is a restricted bit. Provided that this lowest bit is set for restricted key IDs and clear for non-restricted key IDs, every even (and $0^{th}$) key ID is a non-restricted key ID and every odd key ID is a restricted key ID. In such implementation, the number of restricted key IDs is the same as the number of non-restricted key IDs.

In MK-TME architecture (with or without TDX), each memory page may be encrypted with one of the encryption keys. The processor 112 may enforce encryption key usage via the memory controller 120. The memory controller 120 may include or be coupled to the key data structure 121, which includes a number of tables illustrated in FIGS. 2C-2D to enable such enforcement. For example, the memory controller may include the KET 122, which stores mappings of encryption keys to key IDs, as illustrated in FIG. 2C for one implementation where K=128 total keys and $K_{TDX}$=96 restricted keys. In one implementation, encryption keys 255 may be 128-bit keys. The KET 122 may be indexed by the key IDs 250. The partition of key IDs (and, hence, of the encryption keys) may be implemented as described above. When a memory operation is directed at a physical memory address of a physical page of the memory, the processor may extract the key ID from the upper M bits of the physical memory address used for key ID encoding. The processor may then reference the KET 122 to determine which encryption key is to be used to decrypt or encrypt the physical page of the memory.

In some implementations, an additional row of poison status bits 260 is added to the KET 122, where each status bit of the poison status bits 260 indicates whether a corresponding key and key ID pair have been poisoned. The poison status bit may be set in cases where, although a memory ownership bit has matched the access type during a memory read request, there is a MAC mismatch. (Note that any reference to a "read request" herein should be construed to also include an "execute request" as both access cache lines of the memory 130). The MAC mismatch may be an indication of attempts to build a dictionary of encrypted data and/or brute force attempts to find a match to for the MAC stored with or in association with a cache line. The details of why a poison status bit in the KET 122 may be set will be discussed in detail with referenced to FIGS. 7A-7B.

In various implementations, once a key has been poisoned in this way, the cryptographic engine 136, in response to a memory access request (e.g., write, read, execute) using a corresponding poisoned key ID, returns an integrity failure to the requesting agent. In one implementation, the KET 122 is a micro-architectural hardware table for configuring the cryptographic engine 136. The partition of KET 122 into TDX keys and MK-TME keys may be performed by the TDCONFIGKEY instruction. In some implementations, the poison status bit is cleared by executing a PCONFIG (or similar processor configuration instruction) to reprogram the key ID for use with a new key, but the old "poisoned" key is now invalid and will not be used again. In this way, an attacker cannot access data using a poisoned key at any time in the future.

The memory controller 120 may also include or be coupled to the KOT 124 (FIG. 2D). The KOT 124 may store the allocations 265 of key IDs 250 to various TDs and software running outside the TCB of each respective TD, such as the hypervisor 140. The KOT may be indexed by key ID 250, in one implementation. For each key ID 250, the KOT 124 may store a reference to an entity to which the key ID 250 is currently assigned. For example, the first non-restricted key ID=0 may be allocated to the hypervisor 140 to encrypt the physical memory pages used in hypervisor root operations. A number of other non-restricted key IDs 250 may be further allocated to, or for use by, the hypervisor 140. The hypervisor may further allocate some of the non-restricted key IDs 250 to other applications, such as the VMs 155 running outside the TDX architecture. The KOT 124 may also store allocation of restricted key IDs to various executed TDs: TD1, TD2, TD3, and so on. More than one restricted key ID 250 may be allocated to the same TD. Some of the restricted key IDs 250 may not be assigned to any TDs but may be reserved for a later use, as needed.

In implementations, the KOT 124 is a micro-architectural hardware table for managing the TDX and MK-TME inventory, in particular for assigning key IDs 250 to TDs 150A-C, revoking key IDs 250, and controlling flushing cache 118 before reassigning key IDs 250 to different TDs. The KOT 124 may provide hardware protection against multiple concurrent assignments of the same TDX key IDs to different TDs.

In implementations, the KET 122 and the KOT 124 are combined into the same key data structure 121 as both are indexed by the key IDs. Further, the memory controller 120 and/or the cryptographic engine 136 may reference either or both of the KET 122 and the KOT 124 in order to determine whether a key ID located within the physical address of a memory operation is a TD key ID. Because the KET 122 and the KOT 124 are implemented in the hardware of the processor 112, these tables are not directly accessible by software. This allows the processor 112 to track the proper operation of the software and guarantee the TDX security objectives.

In various implementations, when the memory controller 120 detects a memory operation directed at a physical page of the memory allocated to a specific TD, the memory controller 120 may generate a fault and/or abort procedure in a number of situations, including but not limited to the following: 1) A memory operation that includes a non-restricted ID concatenated to the physical memory address whereas the physical page of the memory is a private page allocated to a TD. 2) A memory operation that includes a wrong restricted key ID concatenated to the physical memory address for which a different restricted key ID is expected. 3) A memory operation that includes a correct restricted key ID concatenated to the physical memory address but the memory operation is initiated by a software program outside the TCB of the TD to which the restricted key ID is allocated (e.g., the memory operation that is initiated by the hypervisor 140 or by a software program executing inside a different TD).

In particular, in the first situation, a trusted software executing in the TD 150A may erroneously concatenate a non-restricted (either shared or non-shared) MK-TME request key ID to the physical memory address of a private physical page of the memory which is encrypted (or is expected to be encrypted—in case of a write operation) with one of the restricted TDX keys allocated to the TD 150A. In this case, the memory controller 120, via the cryptographic engine 136, may detect that none of the restricted bits of the request key ID is set and that, therefore, the request key ID is not one of the restricted key IDs.

Correspondingly, the memory controller 120 may generate a fault, e.g. a non-restricted key page fault, in response to a determination that at least one of the restricted bits of the request key ID is set (or clear, in some implementations, as discussed above). The fault may be used to inform the software program which initiated the memory operation that a non-restricted key has been used where a restricted key is expected. In some implementations, the memory controller 120 may further detect that the memory operation originated outside a trust computing base of the TD 150A (for example, an operation from one of TDs 150 B-C, one of VMs 155 operating outside a TD, a hypervisor 140, and so on) and generate silent abort-page semantics. In some implementations, this may mean that write operations are silently ignored whereas read operations return invalid data with a fixed pattern, e.g., bits of all zero values or all one values.

Figure 3:
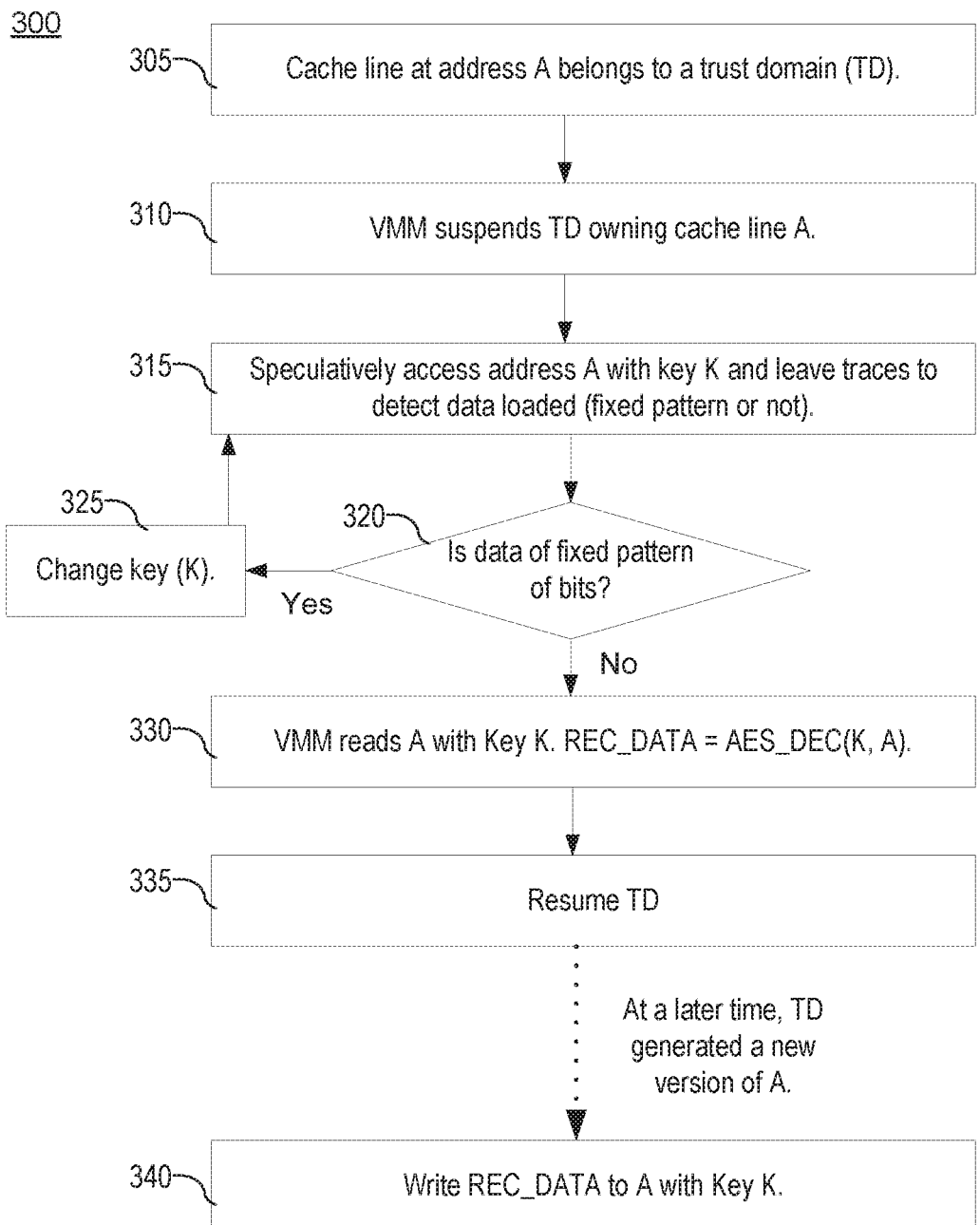
FIG. 3 is a flow chart of a method for conducting a software attack on a TD, according to one implementation.

FIG. 3 is a flow chart of a method 300 for conducting a software attack on a TD, according to one implementation. Although using the VMM 140 as an example, the attack may be performed by processing logic executing on a CSP component or device or a component or device communicating remotely through the CSP component or device. In the attack scenario of FIG. 3, there is a cacheline at physical address A belonging to a TD (305). The VMM 140, which is still in control of scheduling decisions, suspends the TD owning this cacheline (310). The VMM 140 may further create a code sequence to allow it to access this cacheline speculatively (315). It is easier to attack with speculative access because an integrity failure does not result in a machine check exception (MCE). It would therefore take more time to do the attack if performed non-speculatively and have to wait for MCEs to clear.

In implementations, considering that the cacheline is integrity protected, the VMM 140 access to the cacheline results in an integrity failure as the VMM 140 does not know the key that is used by the TD. Integrity failure by asserting a poison bit in a cache line sent to the core 114. The poison bit is currently what is used to indicate uncorrectable error correction code (ECC) errors from the memory 130. Along with poisoning the data, the data is returned as a fixed pattern of bits, e.g., could be all zero values, all one values, or every other bit is a zero value and a one value, among other possibilities. When poisoned data is consumed on the core, it results in a MCE. Note that there can be other ways to signal integrity failures back to the core and the attack highlighted here can be adapted to the particular method chosen by the implementation.

In implementations, the VMM 140 may determine whether the data being returned is of the fixed pattern of bits (320). If yes, then the VMM 140 knows that key is incorrect and changes the key (325). With a different key, the VMM 140 can repeat the access attempts to cacheline A (315), which attempts may be performed until finding a key that generates the same MAC that was generated using the TD key for the ciphertext at address A. Note that the number of attempts that might be required to accomplish this successfully depends on the strength of the MAC. But, because the MAC is much smaller than the data, there will be collisions eventually, and the abilities of quantum computers make performing this attack more viable because brute force guessing can be done in shorter periods of time. Smaller MACs, furthermore, increase the probability of finding such collisions and hence increase the likelihood of this attack to succeed.

In order for the VMM 140 to not get detected through integrity failures, the access to TD data can be done speculatively and the VMM can leave traces behind to detect whether a particular attempt was successful or not. In the particular implementation where poisoned and zeroed data is returned to the core, the VMM 140 can leave traces to indicate data loaded without the fixed pattern of bits, which would indicate that the attempt succeeded. An example of such trace could be where the VMM 140 loads a specific memory location on detecting the data from A without the fixed pattern, and then in the non-speculative path, load the same location and measure the access time to determine whether the location is in the cache or not. Using these side channels, a VMM 140 may determine when it has found a key that generates a colliding MAC for that data generated with the TD's key. The VMM can record this data and key used to generate the colliding MAC (330). The VMM 140 may then resume the TD to allow the TD to continue executing (335).

In the current attack scenario, at a later point in time, when the TD has written new values to A, the VMM 140 uses the colliding key and recorded data it found and write to A (340). This write may restore the ciphertext in TD's domain that the VMM 140 had recorded earlier, thereby successfully replaying stale data to the TD. Note that the attack may be targeted to locations where replay can result in breaking the security of the TD, such as is the case of replaying a counter value that tracks unsuccessful login attempts into a computer, device, or application. In this way, an attacker may have virtually unlimited attempts at logging in and brute force determine the password.

Note that while the attack described above uses a fixed pattern of bits in data on integrity failure as a side channel to detect integrity failures, there can be other side channels to detect integrity failures in other implementations, making these attacks broadly applicable to different implementations. Additionally, the attack that is discussed with reference to FIG. 3 may also be done non-speculatively by the VMM 140. The VMM in this case can simply use the MCE on the processor core to detect integrity failures without having to rely on the poison bit or fixed data pattern indication. In other implementations, there are other known attacks where the VMM 140 can discover plaintext data knowing just the ciphertext data or changed to ciphertext data. As an example, the VMM 140 may construct a dictionary of ciphertext values using frequency analysis to determine plaintext data at a particular location in a TD.

Accordingly, there are multiple attacks that can be conducted if untrusted software is allowed even ciphertext-based access to data that needs to be secured and isolated from the untrusted software (e.g., VMM, in the example scenario, although other untrusted CSP-based software also present risks). It is these types of attacks that the memory ownership bits are designed to protect against in various ways, which may include additional or different types of integrity checks as will be discussed in more detail with reference to FIGS. 4-6 and 7A-7B.

Figure 4:
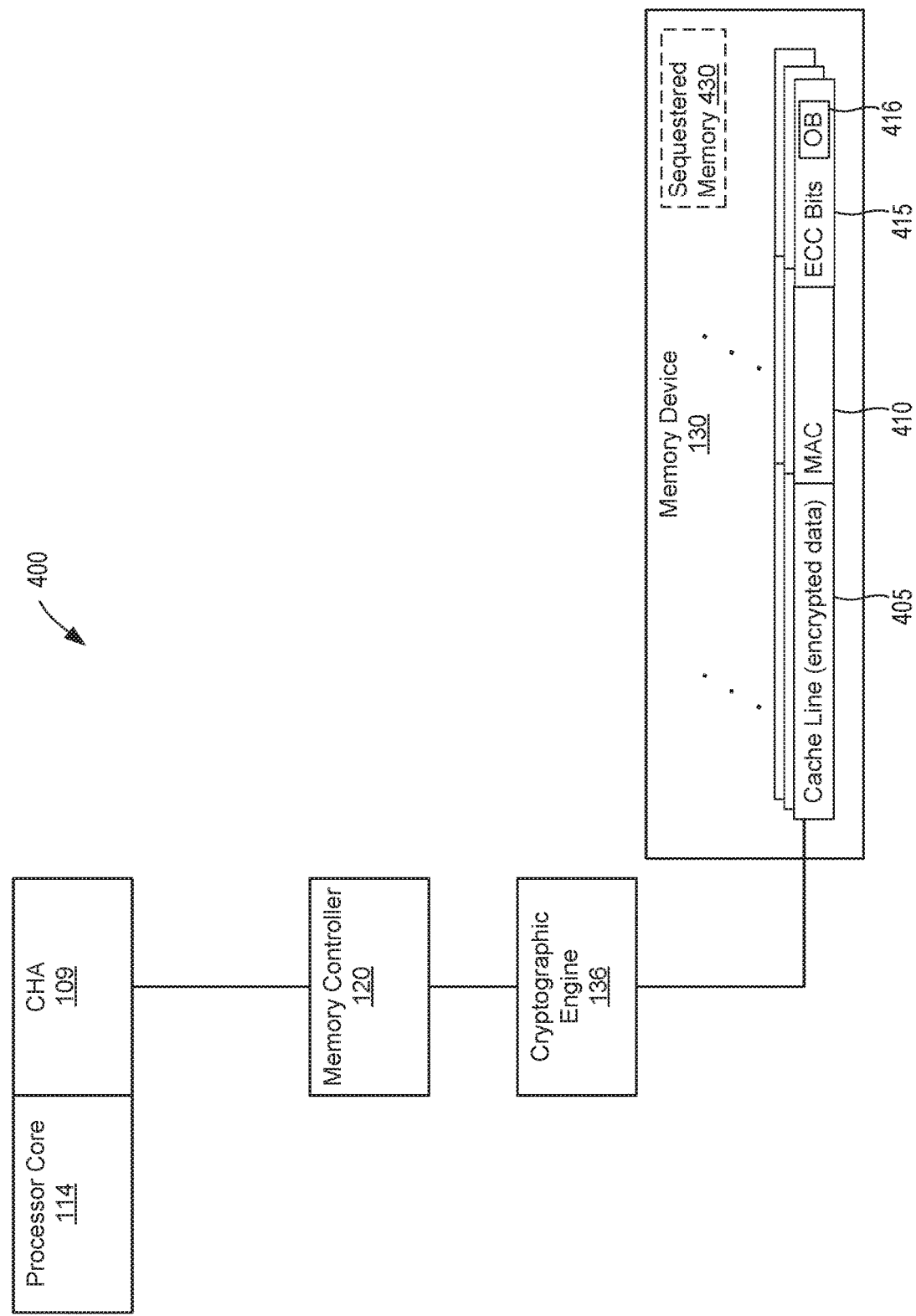
FIG. 4 is a functional flow diagram that illustrates cryptographic engine interaction with ownership bits to track TD ownership of cache lines, according to one implementation.

FIG. 4 is a functional flow diagram 400 that illustrates cryptographic engine interaction with ownership bits to track TD ownership of cache lines, according to one implementation. In various embodiments, the flow of a write or read request (which includes an execute request) from the processor core 114 includes the CHA 109, the memory controller 120, and/or the cryptographic engine 136 communicating with cache lines in the memory 130. In embodiments, each cache line is to store encrypted (e.g., ciphertext) data 405 and metadata including, relevant to this disclosure, a message authentication code (MAC) 410 and error correction code (ECC) bits 415.

In one implementation, one of the ECC bits 415 in each cache line is used as an ownership bit (OB) 416, to indicate whether the encrypted data belong to any of the TDs, e.g., the TD 150A, 150B, 150C, or other TD. In another optional implementation, the memory 130 includes a region of sequestered memory 430 in which the ownership bits for all cache lines are stored and indexed against their corresponding cache lines. Because storing these ownership bits in the sequestered memory 430 uses an additional memory access, if implemented, the ownership bits in the sequestered memory 430 may be cached in the OB cache 118A, e.g., on-die cache of the processor 112 (FIG. 1A).

With TDX, as explained with reference to FIGS. 2A-2D, the key IDs are split into TD and non-TD key IDs and the cryptographic engine 136 may use this knowledge to classify an incoming access as a TD or a non-TD access. In some implementations, the use of ownership bits with cache lines is combined with other mechanisms to allow separation between TDs that operate on the virtualization server 110, and TDX architecture has mechanisms architected to enforce that isolation. At boot, the memory 130 is non-TD memory. In implementations, TDX trusted components (e.g., an entity in the TCB like microcode or other processing logic of the memory controller 120) convert non-TD memory to TD memory. In additional implementations, the VMM 140 can convert portions of the memory 130 from TD to non-TD memory at any point in time, but doing so when the TD is still running and using the memory 130 results in integrity failures in the TD.

Figure 5:
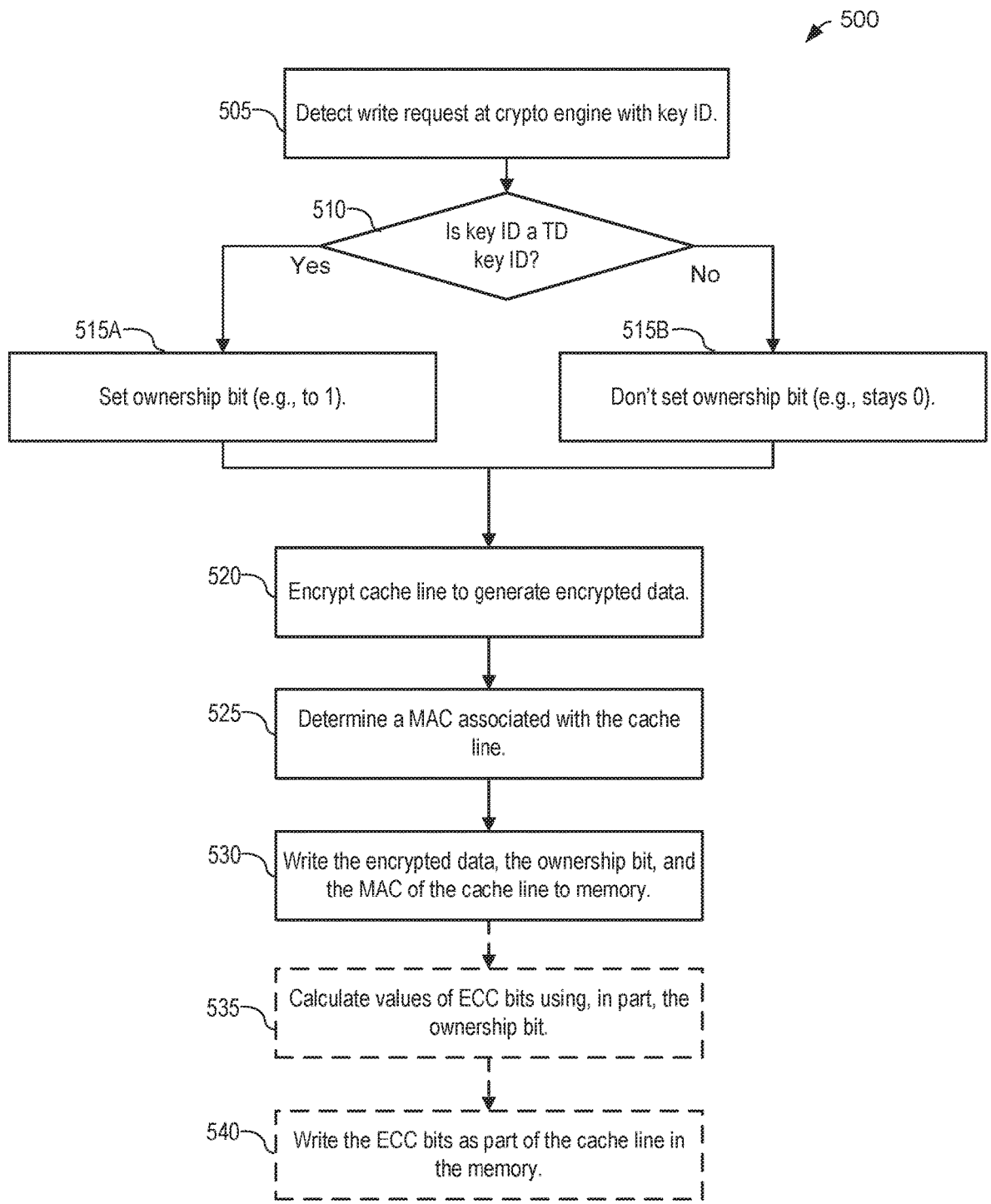
FIG. 5 is a flow chart of a method for writing an ownership bit when writing a cache line to memory, according to one implementation.

FIG. 5 is a flow chart of a method 500 for writing an ownership bit when writing a cache line to memory, according to one implementation. The method 500 may be performed by processing logic that may comprise hardware (e.g., circuitry, dedicated logic, programmable logic, microcode, etc.), firmware, or a combination thereof. In one implementation, the method 500 is performed by the processor 112 of FIG. 1A, e.g., by the memory controller 120. In another implementation, the method 500 is performed by any of the processors described with respect to FIGS. 8A-14.

With reference to FIG. 5, the method 500 may begin with the processing logic detecting, within a write request for a cache line, a key identifier (ID) within a physical address of a location in memory (505). The method 500 may continue with the processing logic determining whether the key ID is a trust domain (TD) key ID of a plurality of key IDs (510). The method 500 may continue with the processing logic, in response to the key ID being a TD key ID, setting an ownership bit of the cache line (e.g., to "1") to indicate the cache line belongs to a trust domain (515A). The method 500 may continue with the processing logic, in response to the key ID not being a TD key ID, not setting an ownership bit of the cache line (e.g., leaving the value as "0") to indicate the cache line does not belong to a trust domain (515B). The method 500 may continue with the processing logic encrypting the cache line to generate encrypted data (520). The method 500 may continue with the processing logic determining a message authentication code (MAC) associated with the cache line (525). The method 500 may continue with the processing logic writing the encrypted data, the ownership bit, and the MAC of the cache line to the memory (530). In different implementations, the ownership bit may be stored with the cache line (e.g., in one of the ECC bits 415) or stored within the sequestered range of memory 430.

In implementations, the cryptographic engine 136 may generate the MAC by applying a keyed hash algorithm (e.g., SHA-3 or any number of others) or a keyed MAC over a combination of at least the encrypted data, an encrypted physical address, and the ownership bit. Optionally, the plaintext of the physical address may also be added into this other data before applying the keyed hash algorithm. The key may be a separate platform or rotating cryptographic key unknown to the attacker that keys the hash algorithm. Because the physical address (whether encrypted or not) is incorporated into the data over which the keyed hash algorithm is applied, the MAC depends in part on the key ID. Because the key ID also identifies whether it is a TD, the MAC is more difficult to verify without access to the key ID. More specifically, a tweak may be incorporated into the MAC, which includes the physical address encrypted with a domain specific teak key, and that makes the MAC dependent on the key ID, or more specifically, the key associated with the key ID.

In some implementations, with additional reference to FIG. 5, the method 500 may optionally continue with the processing logic calculating values of ECC bits using, in part the ownership bit (535). The method 500 may continue with the processing logic writing the ECC bits as part of the cache line in the memory (540). In this way, to generate an ECC calculation in conjunction with the write of the cache line to the memory, the cryptographic engine 136 is further to include the ownership bit within the ECC calculation.

Figure 6:
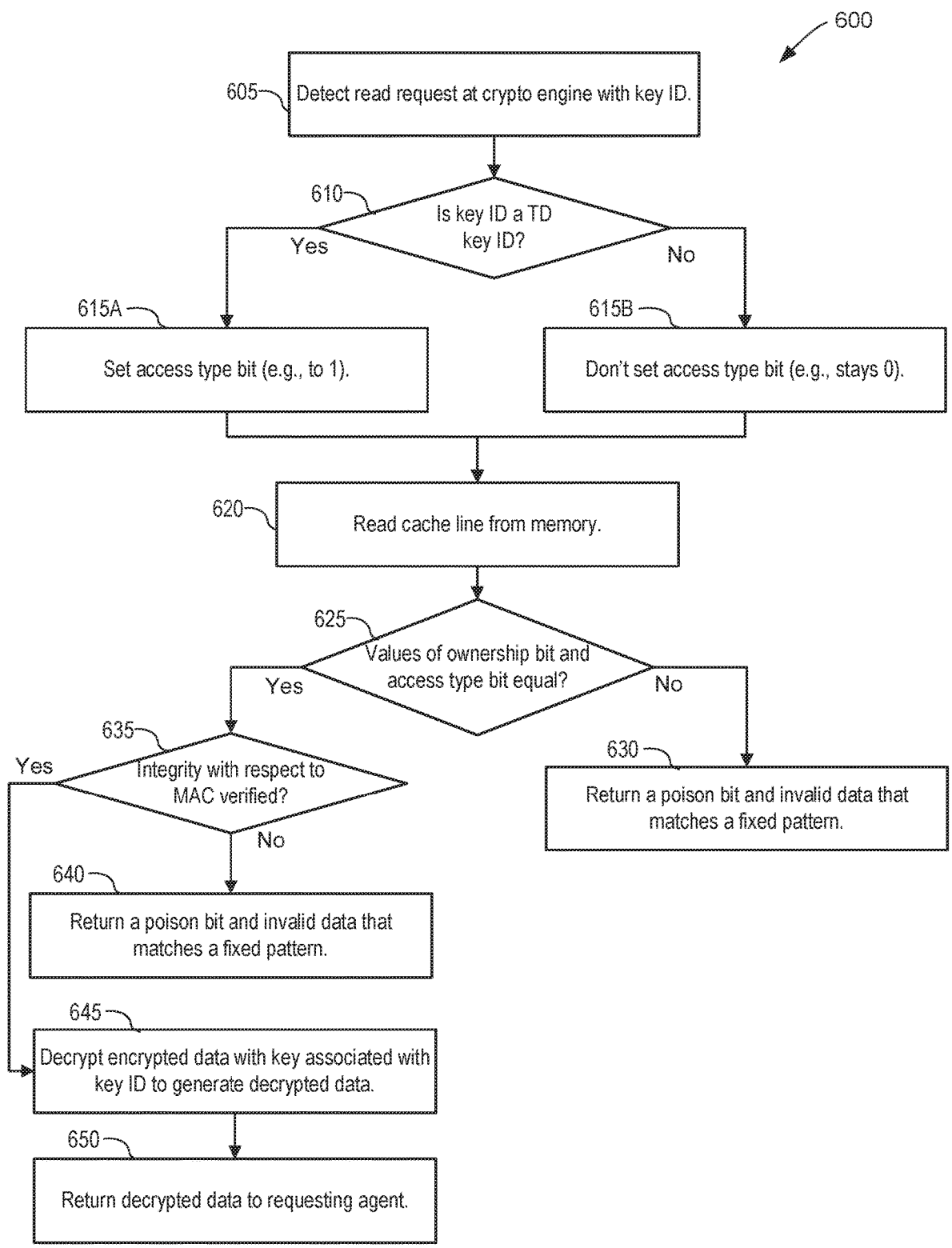
FIG. 6 is a flow chart of a method for reading an ownership bit when reading a cache line in the memory, according to one implementation.

FIG. 6 is a flow chart of a method 600 for reading an ownership bit when reading a cache line in the memory, according to one implementation. The flow of the method 600 may be specifically for an access to the memory with a key ID that has been set up with integrity. The method 600 may be performed by processing logic that may comprise hardware (e.g., circuitry, dedicated logic, programmable logic, microcode, etc.), firmware, or a combination thereof. In one implementation, the method 600 is performed by the processor 112 of FIG. 1A, e.g., by the memory controller 120. In another implementation, the method 600 is performed by any of the processors described with respect to FIGS. 8A-14.

With reference to FIG. 6, the method 600 may begin with the processing logic detecting, within a read request for a cache line from the processor core 114, a key identifier (ID) within a physical address of a location in the memory device 130 (605). The method 600 may continue with the processing logic determining whether the key ID is a TD key id (610). The method 600 may continue with the processing logic, in response to the key ID being a TD key ID, recording the access type bit (e.g., "1") to indicate the key ID is a TD key ID (615A). The method 600 may continue with the processing logic, in response to the key ID not being a TD key ID, recording the access type bit (e.g., "0") to indicate the key ID is not a TD key ID (615B).

With additional reference to FIG. 6, the method 600 may continue with the processing logic reading the cache line from memory (620). The method 600 may continue with the processing logic determining whether a value of the access type bit matches that of the ownership bit (625). If there is not a match, the method 600 may continue with the processing logic return, in response to the read request, a poison bit and invalid data that matches a fixed pattern (630), e.g., that skips any integrity verification. In this way, an attacker attempting to access TD data that is a non-TD agent just gets invalid data and no sensitive encrypted data of the TD.

If there is a match at block 625, the method 600 may continue with the processing logic verifying integrity with respect to the MAC (635). If the MAC is not verified, the method 600 may continue with the processing logic returning a poison bit and invalid data that matches a fixed pattern (640). If the MAC is verified, the method 600 may continue with the processing logic decrypting the encrypted data of the cache line with the encryption key corresponding to the key ID to generate decrypted data (645). The method 600 may continue with the processing logic returning the decrypted data to the requesting agent (650). Going back to the attack scenarios described previously, the method 600 of FIG. 6 deterministically ensures that an attempt by VMM 140 (or untrusted software) to access TD memory will result in integrity failure irrespective of the strength of the integrity algorithm used, thereby defeating the attack outlined before.

In implementations, even if the integrity check at block 635 is not performed (e.g., and the method 600 goes straight to blocks 645 and 650), then the lack of match in values of the ownership bit and the access type bit at block 625 would still result in sending invalid data with a fixed pattern of bits to the requestor. In this way, in even a read request flow without integrity, a requesting agent cannot access ciphertext data if that requesting agent is not a TD. In one implementation, the poison bit is not returned, however.

The ownership bit provides deterministic protection against a rogue VM colluding with a rogue VMM. Hardware is responsible for setting the ownership bits in the memory 130. More specifically, one of the memory controller 120 or the cryptographic engine 136 may be responsible for setting the ownership bits which are not accessible to any software running on the system. The cryptographic engine 136 may use the key ID of the incoming request to determine the ownership bit (FIGS. 5, 6, and 6) and implements the following rules, namely that: 1) a non-TD request (which can come from rogue VM/VMM) can never get access to ciphertext (fixed pattern of bits are returned); and 2) a non-TD request with integrity deterministically gets integrity failure when accessing TD data. This is irrespective of the MAC verification outcome.

The rules above ensure that there is no ciphertext leakage to software and non-TD software cannot construct brute force attacks to forge a MAC. An attacker can also use a malicious TD to try and attack a victim TD. Since a TD is always launched with integrity, the malicious TD cannot just read the victim's TD ciphertext without getting integrity failures, thereby, preventing the attacker's TD from constructing a dictionary. Similarly, a TD colluding with a VMM to conduct replay attacks outlined above has limited control in that the key associated with the TD can only be changed by restarting the TD, hence making brute force attacks impractical in the time required to determine the correct key.

In some embodiments, because BIOS is able to create address ranges, it is possible that BIOS may create aliases, e.g., where most significant bits alias back to lower address bits. Due to aliases, it is possible that two TDs access the same memory location, e.g., BIOS has created two different ranges of memory addresses that map to the same physical memory. The VMM 140 might then map these two different ranges of memory addresses into two different TDs, e.g., the TD 150A and the TD 150B. Assume that TD 150A is suspended and TD 150B comes in and starts reading the data in the memory range using key ID_B (just using different aliased address). This would result in an integrity failure almost every time. One out of every $2^N$ accesses (where N is the number of bits in the MAC), the read access will pass without integrity failure due to the location in memory causes the MAC checks to pass. In other words, an attacker finds the MAC collision and thus know a key that works, and can replay into that same location later.

Although the odds of this kind of attack make the attack less powerful in that such an attack does not allow attacker to control replay of a particular location but allows the attacks to replay a location, which may or may not be of interest. With this attack, the attacker can launch a malicious TD and use an alias to a range of victim TD's memory to speculatively read the victim's memory through its alias. This will likely result in integrity failures not due to the use of incorrect key belonging to the attacker's TD, but due to the N-bit MAC, where after $2^N$ attempts, there is a likelihood of finding a MAC collision. Even though the usefulness of this attack is arguably much lower than the targeted attack as there is a 1 in $2^N$ probability of the attacker finding a location where the collision is meaningful to conduct a replay. Nonetheless, the implementation that employs key poisoning (FIGS. 7A-7B) will prevent even this type of rare attack.

Figure 7A:
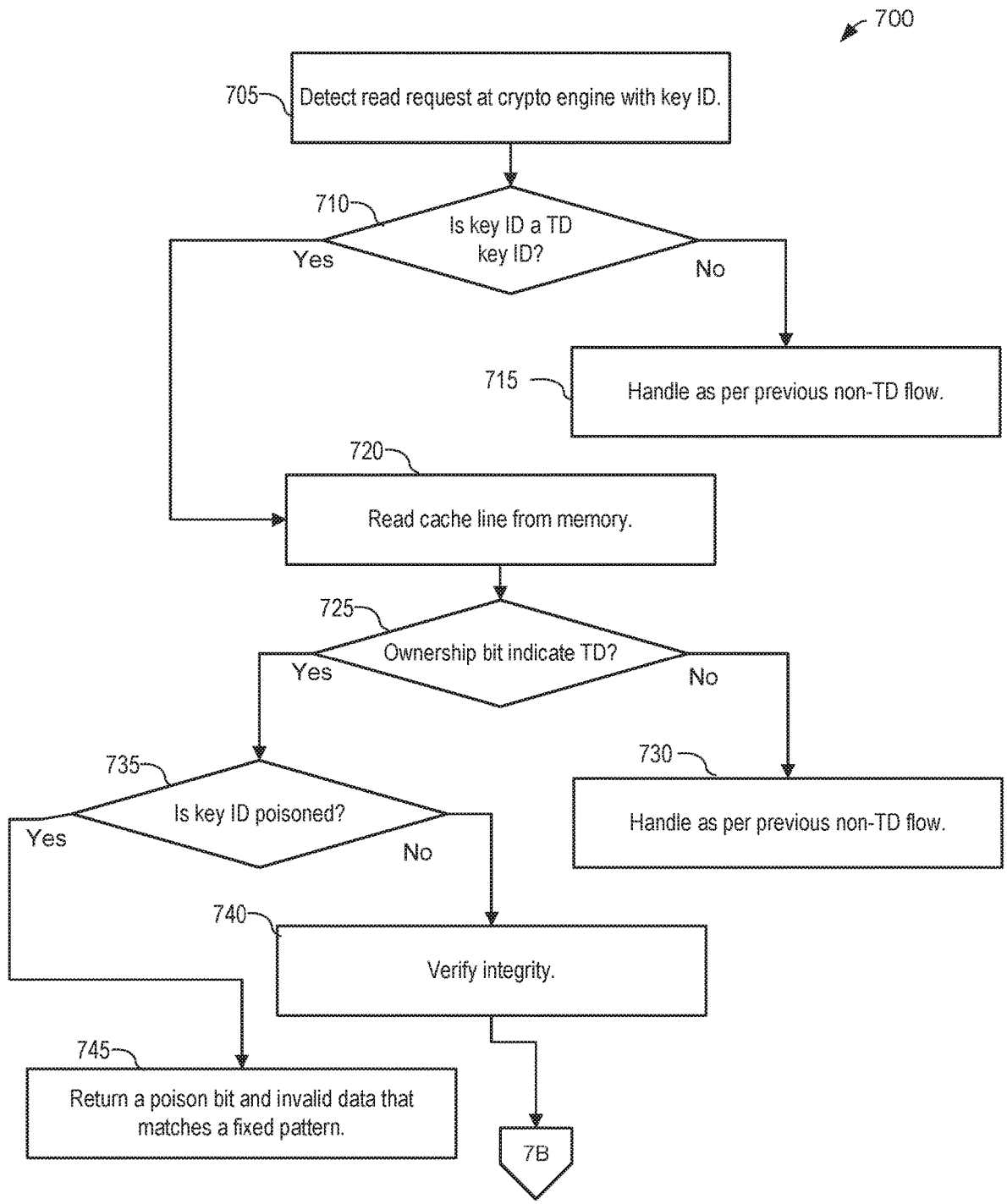
FIGS. 7A-7B are a flow chart of a method for using an ownership bit and key ID poison indictors during a cache line read operation, according to various implementations.
Figure 7B:
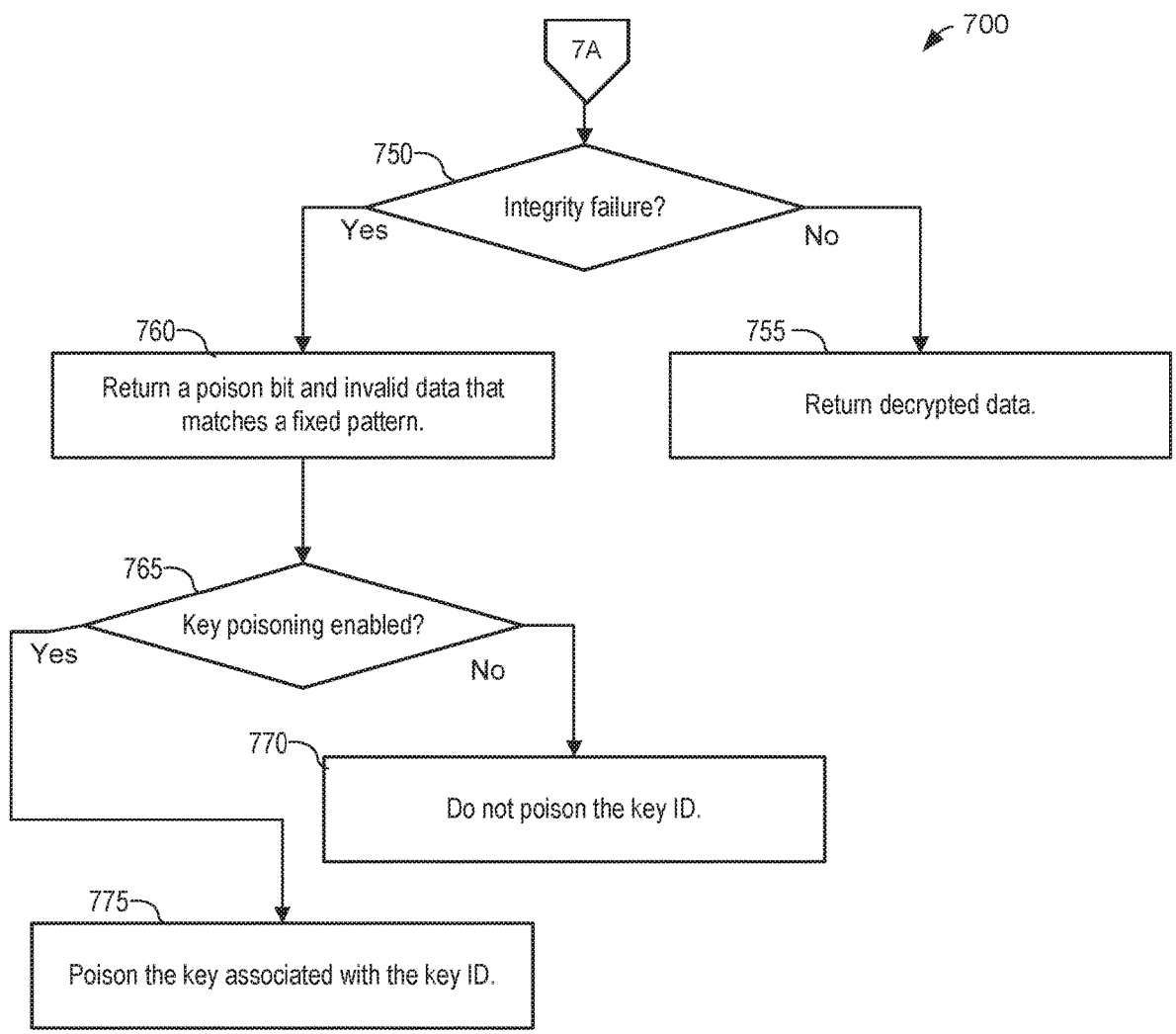

FIGS. 7A-7B are a flow chart of a method 700 for using an ownership bit and key ID poison indictors during a cache line read operation, according to various implementations. The method 700 may be performed by processing logic that may comprise hardware (e.g., circuitry, dedicated logic, programmable logic, microcode, etc.), firmware, or a combination thereof. In one implementation, the method 700 is performed by the processor 112 of FIG. 1A, e.g., by the memory controller 120. In another implementation, the method 700 is performed by any of the processors described with respect to FIGS. 8A-14. With the types of hardware or software attacks discussed previously, the processor 112 is to stop execution of a TD suspected of being attacked. While execution is stopped, in some implementations, the cryptographic engine 136 may poison a key if the ownership bit matches on a TD memory access and there is an integrity failure. The result of a key being poisoned is assertion of a poison status bit within the KET 122 (FIG. 2C).

With additional reference to FIG. 7A, the method 700 may begin with the processing logic detecting, within a read request for a cache line from the processor core, a key identifier (ID) within a physical address of a location in the memory device (705). The method 700 may continue with the processing logic determining whether the key ID is a TD key ID (710). If no, the read request is handled as per previous non-TD access request, e.g., returning unencrypted data after passing an integrity check assuming the memory access bit indicates non-TD data (715). If yes, the key ID is a TD key ID, the method 700 may continue with the processing logic reading data the cache line from the memory (720).

With continued reference to FIG. 7A, the method 700 may continue with the processing logic determining whether the ownership bit stored in the memory for the cache line indicates the cache line belongs to a TD (725). If the ownership bit indicates a non-TD cache line, the method 700 may continue with the processing logic following normal non-TD flow, e.g., by applying an integrity check before returning unencrypted data (730). If the ownership bit indicates the cache line belongs to a TD, the method 700 may continue with the processing logic determining whether the key ID has been poisoned, e.g., by checking a poison status bit of the key data structure (e.g., the KET 122) as discussed with reference to FIG. 2C (735). If the key is not poisoned, the method 700 may continue with the processing logic verifying integrity and continuing on to the flow of FIG. 7B (750). If the key is poisoned, the method 700 may continue with the processing logic returning, in response to the read request, a poison bit and invalid data that matches a fixed pattern (745). In this way, a rouge VM or VMM (or other CSP software or agent) will only get invalid data if the key is poisoned. If it is not poisoned, the method 700 continued to FIG. 7B.

With additional reference to FIG. 7B, the method 700 may continue with the processing logic determining whether there is an integrity failure, e.g., via a comparison of a generated MAC with the MAC of the cache line (750). If the integrity check passes, the method 700 may continue with the processing logic returning decrypted data (755). If the integrity check does not pass, the method 700 may continue with the processing logic returning, in response to the read request, a poison bit and invalid data that matches a fixed pattern (760). The method 700 may continue with the processing logic determining whether key poisoning is enabled for the processor (765). If not, the key and corresponding key ID are not poisoned (770). If yes, the method 700 may continue with the processing logic poisoning the key associated with the key ID, e.g., by setting the poison status bit 260 in the KET 122 illustrated in FIG. 2C (775).

As discussed, the poison status bit can be cleared by executing a PCONFIG (or similar processor configuration instruction) to reprogram the key ID for use with a new key, but the old "poisoned" key is now invalid and will not be used again. Furthermore, any data stored in the memory that is encrypted with the poisoned key is cleared out. In this way, an attacker cannot access data using a poisoned key at any time in the future.

FIG. 8A is a block diagram illustrating a micro-architecture for a processor 800 that implements TD memory access checks using ownership bits tagged on cache lines. Specifically, processor 800 depicts an in-order architecture core and a register renaming logic, out-of-order issue/execution logic to be included in a processor according to at least one implementation of the disclosure.

Processor 800 includes a front end unit 830 coupled to an execution engine unit 850, and both are coupled to a memory unit 870. The processor 800 may include a reduced instruction set computing (RISC) core, a complex instruction set computing (CISC) core, a very long instruction word (VLIW) core, or a hybrid or alternative core type. As yet another option, processor 800 may include a special-purpose core, such as, for example, a network or communication core, compression engine, graphics core, or the like. In one implementation, processor 800 may be a multi-core processor or may be part of a multiprocessor system.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 840 may be implemented using various different mechanisms. Examples of suitable mechanisms include, but are not limited to, look-up tables, hardware implementations, programmable logic arrays (PLAs), microcode read only memories (ROMs), etc. The instruction cache unit 834 is further coupled to the memory unit 870. The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different scheduler circuits, including reservations stations (RS), central instruction window, etc. The scheduler unit(s) 856 is coupled to the physical register set(s) unit(s) 858. Each of the physical register set(s) units 858 represents one or more physical register sets, different ones of which store one or more different data types, such as scalar integer, scalar floating point, packed integer, packed floating point, vector integer, vector floating point, etc., status (e.g., an instruction pointer that is the address of the next instruction to be executed), etc. The physical register set(s) unit(s) 858 is overlapped by the retirement unit 854 to illustrate various ways in which register renaming and out-of-order execution may be implemented (e.g., using a reorder buffer(s) and a retirement register set(s), using a future file(s), a history buffer(s), and a retirement register set(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 854 and the physical register set(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and operate on various types of data (e.g., scalar floating point, packed integer, packed floating point, vector integer, vector floating point).

While some implementations may include a number of execution units dedicated to specific functions or sets of functions, other implementations may include only one execution unit or multiple execution units that all perform all functions. The scheduler unit(s) 856, physical register set(s) unit(s) 858, and execution cluster(s) 860 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register set(s) unit, and/or execution cluster—and in the case of a separate memory access pipeline, certain implementations are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which may include a data prefetcher 880, a data TLB unit 872, a data cache unit (DCU) 874, and a level 2 (L2) cache unit 876, to name a few examples. In some implementations DCU 874 is also known as a first level data cache (L1 cache). The DCU 874 may handle multiple outstanding cache misses and continue to service incoming stores and loads. It also supports maintaining cache coherency. The data TLB unit 872 is a cache used to improve virtual address translation speed by mapping virtual and physical address spaces. In one exemplary implementation, the memory access units 864 may include a load unit, a store address unit, and a store data unit, each of which is coupled to the data TLB unit 872 in the memory unit 870. The L2 cache unit 876 may be coupled to one or more other levels of cache and eventually to a main memory.

In one implementation, the data prefetcher 880 speculatively loads/prefetches data to the DCU 874 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 800 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated implementation of the processor also includes a separate instruction and data cache units and a shared L2 cache unit, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

FIG. 8B is a block diagram illustrating an in-order pipeline and a register renaming stage, out-of-order issue/execution pipeline implemented by processor 800 of FIG. 8A according to some implementations of the disclosure. The solid lined boxes in FIG. 8B illustrate an in-order pipeline 801, while the dashed lined boxes illustrate a register renaming, out-of-order issue/execution pipeline 803. In FIG. 8B, the pipelines 801 and 803 include a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 820, and a commit stage 822. In some implementations, the ordering of stages 802-824 may be different than illustrated and are not limited to the specific ordering shown in FIG. 8B.

Figure 9:
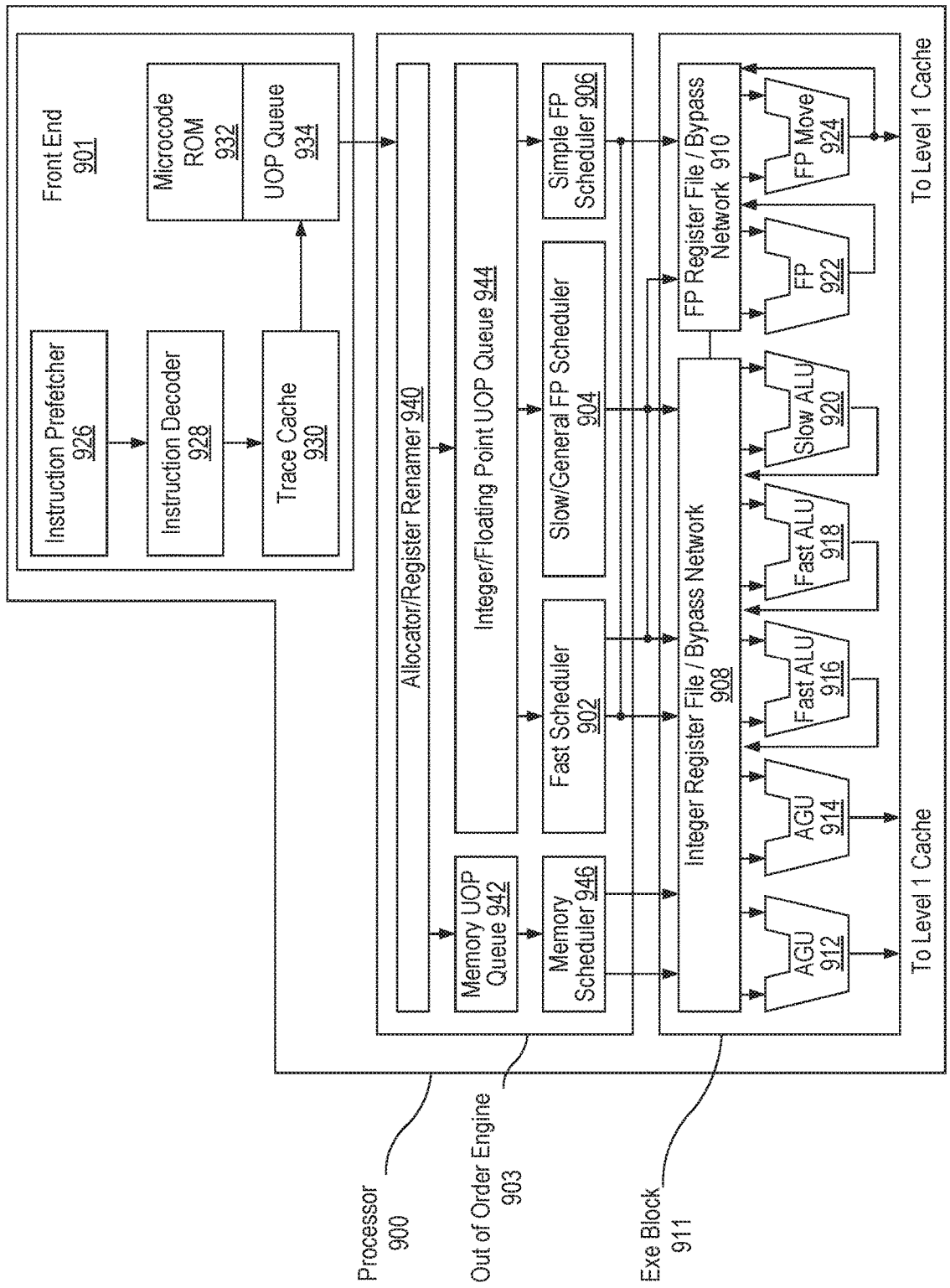
FIG. 9 illustrates a block diagram of the micro-architecture for a processing device that includes logic circuits to provide TD memory access checks using ownership bits tagged on cache lines according to one implementation.

FIG. 9 illustrates a block diagram of the micro-architecture for a processor 900 that includes logic circuits of a processor or an integrated circuit that implements hardware support for TD memory access checks using ownership bits tagged on cache lines, according to an implementation of the disclosure. In some implementations, an instruction in accordance with one implementation can be implemented to operate on data elements having sizes of byte, word, doubleword, quadword, etc., as well as datatypes, such as single and double precision integer and floating point datatypes. In one implementation the in-order front end 901 is the part of the processor 900 that fetches instructions to be executed and prepares them to be used later in the processor pipeline. The implementations of the page additions and content copying can be implemented in processor 900.

The front end 901 may include several units. In one implementation, the instruction prefetcher 926 fetches instructions from memory and feeds them to an instruction decoder 928 which in turn decodes or interprets them. For example, in one implementation, the decoder decodes a received instruction into one or more operations called "micro-instructions" or "micro-operations" (also called micro op or uops) that the machine can execute. In other implementations, the decoder parses the instruction into an opcode and corresponding data and control fields that are used by the micro-architecture to perform operations in accordance with one implementation. In one implementation, the trace cache 930 takes decoded uops and assembles them into program ordered sequences or traces in the uop queue 934 for execution. When the trace cache 930 encounters a complex instruction, microcode ROM (or RAM) 932 provides the uops needed to complete the operation.

Some instructions are converted into a single micro-op, whereas others need several micro-ops to complete the full operation. In one implementation, if more than four micro-ops are needed to complete an instruction, the instruction decoder 928 accesses the microcode ROM 932 to do the instruction. For one implementation, an instruction can be decoded into a small number of micro ops for processing at the instruction decoder 928. In another implementation, an instruction can be stored within the microcode ROM 932 should a number of micro-ops be needed to accomplish the operation. The trace cache 930 refers to an entry point programmable logic array (PLA) to determine a correct micro-instruction pointer for reading the micro-code sequences to complete one or more instructions in accordance with one implementation from the micro-code ROM 932. After the microcode ROM 932 finishes sequencing micro-ops for an instruction, the front end 901 of the machine resumes fetching micro-ops from the trace cache 930.

The out-of-order execution engine 903 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register set. The allocator also allocates an entry for each uop in one of the two uop queues, one for memory operations and one for non-memory operations, in front of the instruction schedulers: memory scheduler, fast scheduler 902, slow/general floating point scheduler 904, and simple floating point scheduler 906. The uop schedulers 902, 904, 906, determine when a uop is ready to execute based on the readiness of their dependent input register operand sources and the availability of the execution resources the uops need to complete their operation. The fast scheduler 902 of one implementation can schedule on each half of the main clock cycle while the other schedulers can only schedule once per main processor clock cycle. The schedulers arbitrate for the dispatch ports to schedule uops for execution.

Register sets 908, 910, sit between the schedulers 902, 904, 906, and the execution units 912, 914, 916, 918, 920, 922, 924 in the execution block 911. There is a separate register set 908, 910, for integer and floating point operations, respectively. Each register set 908, 910, of one implementation also includes a bypass network that can bypass or forward just completed results that have not yet been written into the register set to new dependent uops. The integer register set 908 and the floating point register set 910 are also capable of communicating data with the other. For one implementation, the integer register set 908 is split into two separate register sets, one register set for the low order 32 bits of data and a second register set for the high order 32 bits of data. The floating point register set 910 of one implementation has 128 bit wide entries because floating point instructions typically have operands from 64 to 128 bits in width.

The execution block 911 contains the execution units 912, 914, 916, 918, 920, 922, 924, where the instructions are actually executed. This section includes the register sets 908, 910, that store the integer and floating point data operand values that the micro-instructions need to execute. The processor 900 of one implementation is comprised of a number of execution units: address generation unit (AGU) 912, AGU 914, fast ALU 916, fast ALU 918, slow ALU 920, floating point ALU 912, floating point move unit 914. For one implementation, the floating point execution blocks 912, 914, execute floating point, MMX, SIMD, and SSE, or other operations. The floating point ALU 912 of one implementation includes a 64 bit by 64 bit floating point divider to execute divide, square root, and remainder micro-ops. For implementations of the disclosure, instructions involving a floating point value may be handled with the floating point hardware.

In one implementation, the ALU operations go to the high-speed ALU execution units 916, 918. The fast ALUs 916, 918, of one implementation can execute fast operations with an effective latency of half a clock cycle. For one implementation, most complex integer operations go to the slow ALU 920 as the slow ALU 920 includes integer execution hardware for long latency type of operations, such as a multiplier, shifts, flag logic, and branch processing. Memory load/store operations are executed by the AGUs 922, 924. For one implementation, the integer ALUs 916, 918, 920, are described in the context of performing integer operations on 64 bit data operands. In alternative implementations, the ALUs 916, 918, 920, can be implemented to support a variety of data bits including 16, 32, 128, 256, etc. Similarly, the floating point units 922, 924, can be implemented to support a range of operands having bits of various widths. For one implementation, the floating point units 922, 924, can operate on 128 bits wide packed data operands in conjunction with SIMD and multimedia instructions.

In one implementation, the uops schedulers 902, 904, 906, dispatch dependent operations before the parent load has finished executing. As uops are speculatively scheduled and executed in processor 900, the processor 900 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one implementation of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an implementation should not be limited in meaning to a particular type of circuit. Rather, a register of an implementation is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one implementation, integer registers store 32-bit integer data. A register set of one implementation also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one implementation, in storing packed data and integer data, the registers do not need to differentiate between the two data types. In one implementation, integer and floating point are either contained in the same register set or different register sets. Furthermore, in one implementation, floating point and integer data may be stored in different registers or the same registers.

Figure 10:
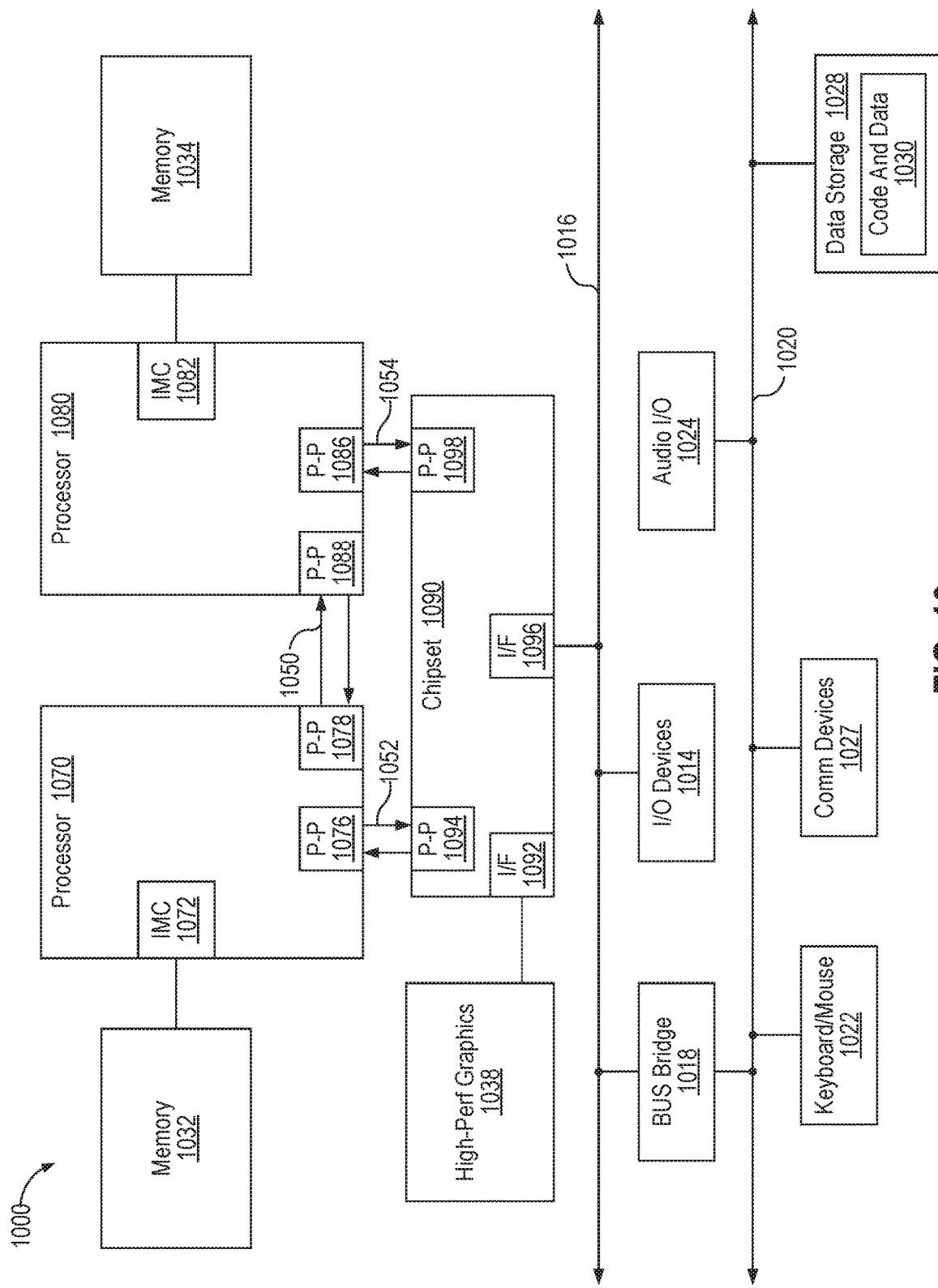
FIG. 10 is a block diagram of a computer system according to one implementation.

Implementations may be implemented in many different system types. Referring now to FIG. 10, shown is a block diagram of a multiprocessor system 1000 that may implement hardware support for TD memory access checks using ownership bits tagged on cache lines, in accordance with an implementation. As shown in FIG. 10, multiprocessor system 1000 is a point-to-point interconnect system, and includes a first processor 1070 and a second processor 1080 coupled via a point-to-point interconnect 1050. As shown in FIG. 10, each of processors 1070 and 1080 may be multicore processors, including first and second processor cores (i.e., processor cores 1074*a* and 1074*b* and processor cores 1084*a* and 1084*b*), although potentially many more cores may be present in the processors. While shown with two processors 1070, 1080, it is to be understood that the scope of the disclosure is not so limited. In other implementations, one or more additional processors may be present in a given processor.

Processors 1070 and 1080 are shown including integrated memory controller units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may exchange information with a chipset 1090 via individual P-P interfaces 1052, 1054 using point to point interface circuits 1076, 1094, 1086, 1098. Chipset 1090 may also exchange information with a high-performance graphics circuit 1038 via a high-performance graphics interface 1092.

Chipset 1090 may be coupled to a first bus 1016 via an interface 1096. In one implementation, first bus 1016 may be a Peripheral Component Interconnect (PCI) bus, or a bus such as a PCI Express bus or interconnect bus, although the scope of the disclosure is not so limited.

As shown in FIG. 10, various I/O devices 1014 may be coupled to first bus 1016, along with a bus bridge 1018 which couples first bus 1016 to a second bus 1020. In one implementation, second bus 1020 may be a low pin count (LPC) bus. Various devices may be coupled to second bus 1020 including, for example, a keyboard and/or mouse 1022, communication devices 1027 and a storage unit 1028 such as a disk drive or other mass storage device which may include instructions/code and data 1030, in one implementation. Further, an audio I/O 1024 may be coupled to second bus 1020. Note that other architectures are possible. For example, instead of the point-to-point architecture of FIG. 10, a system may implement a multi-drop bus or other such architecture.

Figure 11:
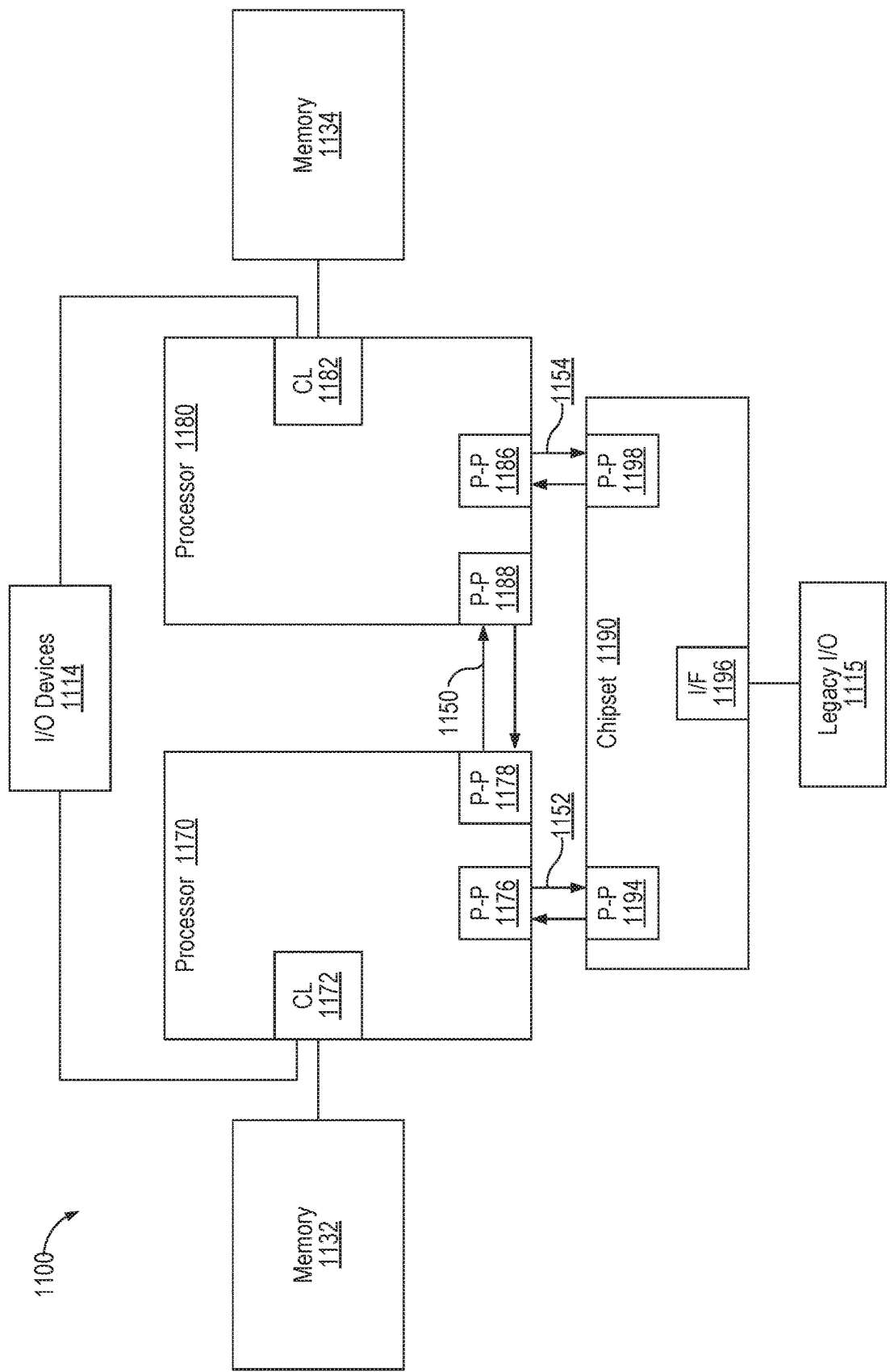
FIG. 11 is a block diagram of a computer system according to another implementation.

Referring now to FIG. 11, shown is a block diagram of a third system 1100 that may implement hardware support for TD memory access checks using ownership bits tagged on cache lines, in accordance with an implementation of the disclosure. Like elements in FIGS. 10 and 11 bear like reference numerals and certain aspects of FIG. 11 have been omitted from FIG. 10 in order to avoid obscuring other aspects of FIG. 10.

FIG. 11 illustrates processors 1170, 1180. In one implementation, processors 970, 980 may implement hybrid cores as described above. Processors 1170, 1180 may include integrated memory and I/O control logic ("CL") 1172 and 1192, respectively and intercommunicate with each other via point-to-point interconnect 1150 between point-to-point (P-P) interfaces 1178 and 1188 respectively. Processors 1170, 1180 each communicate with chipset 1190 via point-to-point interconnects 1152 and 1154 through the respective P-P interfaces 1176 to 1194 and 1186 to 1198 as shown. For at least one implementation, the CL 1172, 1182 may include integrated memory controller units such as described herein. In addition. CL 1172, 1192 may also include I/O control logic. FIG. 11 illustrates that the memories 1132, 1134 are coupled to the CL 1172, 1192, and that I/O devices 1114 are also coupled to the control logic 1172, 1192. Legacy I/O devices 1115 are coupled to the chipset 1190 via interface 1196.

Figure 12:
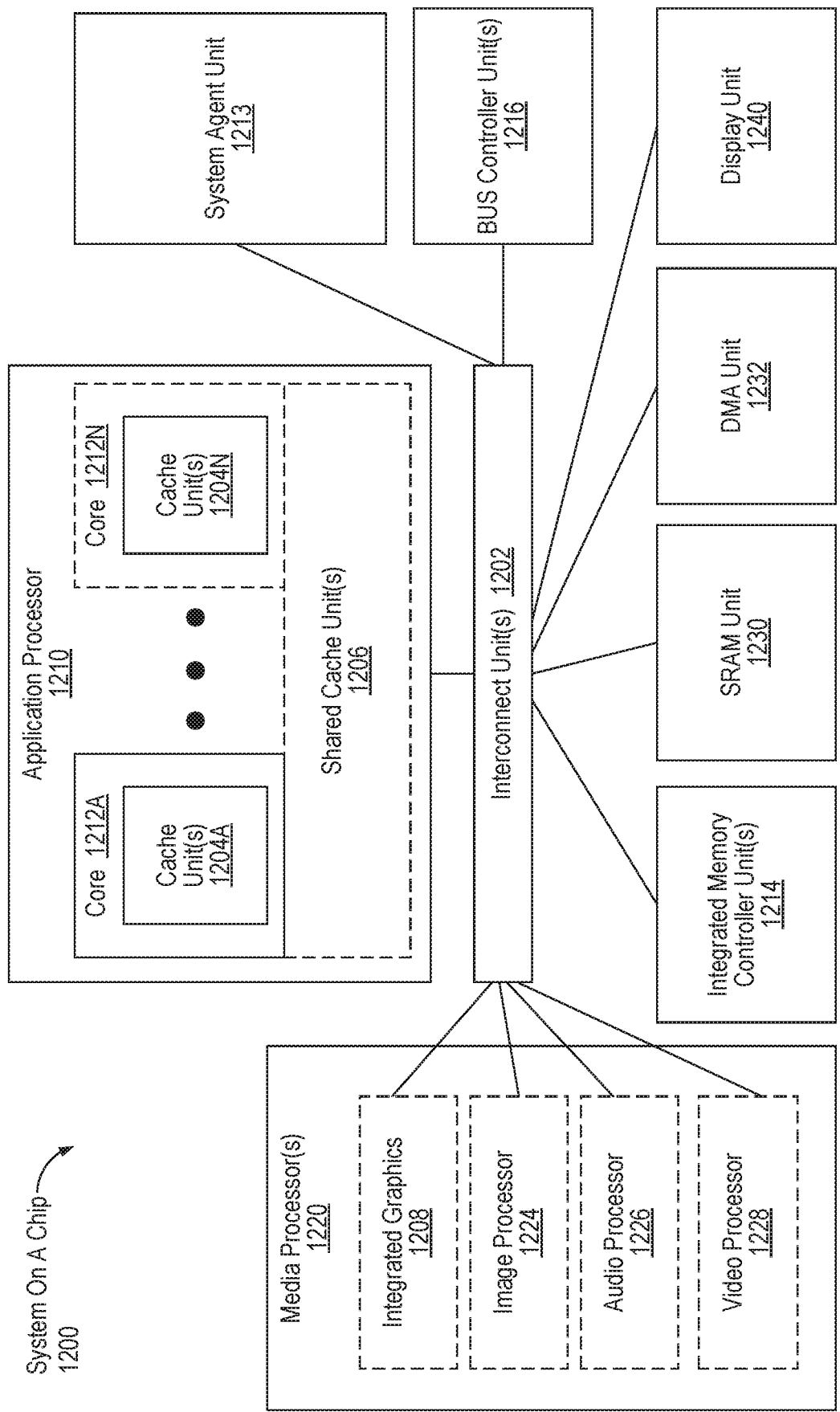
FIG. 12 is a block diagram of a system-on-a-chip according to one implementation.

FIG. 12 is an exemplary system on a chip (SoC) 1200 that may include one or more of the cores 1202A . . . 1202N that may implement hardware support for TD memory access checks using ownership bits tagged on cache lines. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Within the exemplary SoC 1200 of FIG. 12, dashed lined boxes are features on more advanced SoCs. An interconnect unit(s) 1203 may be coupled to: an application processor 1217 which includes a set of one or more cores 1202A-N, containing one or more cache unit(s) 1204A . . . 1204N, respectively, and shared cache unit(s) 1206; a system agent unit 1210; a bus controller unit(s) 1216; an integrated memory controller unit(s) 1214; a set of one or more media processors 1220 which may include integrated graphics logic 1208, an image processor 1224 for providing still and/or video camera functionality, an audio processor 1226 for providing hardware audio acceleration, and a video processor 1228 for providing video encode/decode acceleration; a static random access memory (SRAM) unit 1230; a direct memory access (DMA) unit 1232; and a display unit 1240 for coupling to one or more external displays.

Figure 13:
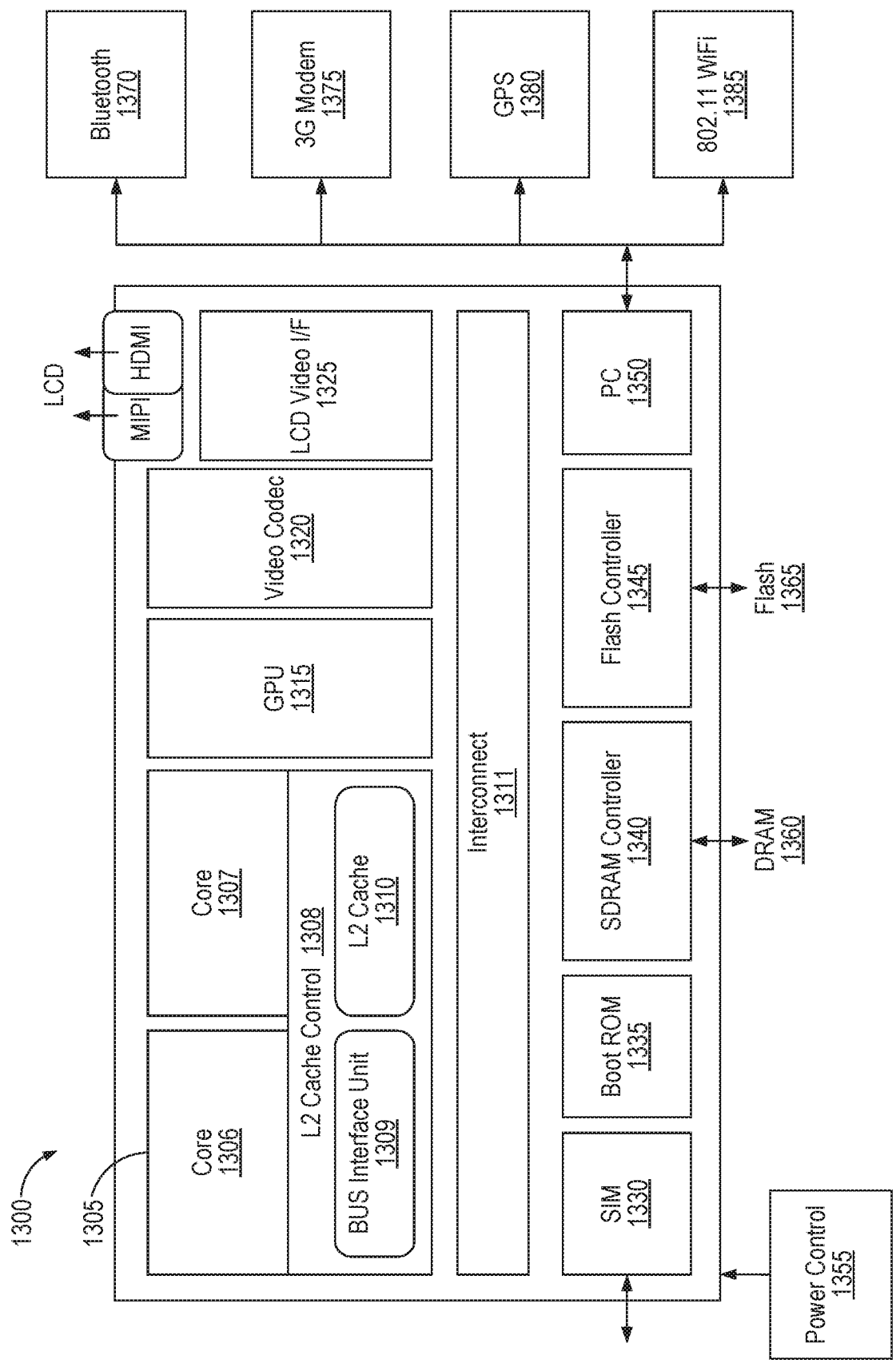
FIG. 13 illustrates another implementation of a block diagram for a computing system.

Turning next to FIG. 13, an implementation of a system on-chip (SoC) design that may implement hardware support for TD memory access checks using ownership bits tagged on cache lines, in accordance with implementations of the disclosure is depicted. As an illustrative example, SoC 1300 is included in user equipment (UE). In one implementation, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The implementations of the page additions and content copying can be implemented in SoC 1300.

Here, SoC 1300 includes 2 cores—1306 and 1307. Similar to the discussion above, cores 1306 and 1307 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1306 and 1307 are coupled to cache control 1308 that is associated with bus interface unit 1309 and L2 cache 1310 to communicate with other parts of system 1300. Interconnect 1311 includes an on-chip interconnect, such as an IOSF, AMBA, or other interconnects discussed above, which can implement one or more aspects of the described disclosure.

In one implementation, SDRAM controller 1340 may connect to interconnect 1311 via cache 1310. Interconnect 1311 provides communication channels to the other components, such as a Subscriber Identity Module (SIM) 1330 to interface with a SIM card, a boot ROM 1335 to hold boot code for execution by cores 1306 and 1307 to initialize and boot SoC 1300, a SDRAM controller 1340 to interface with external memory (e.g. DRAM 1360), a flash controller 1345 to interface with non-volatile memory (e.g. Flash 1365), a peripheral control 1350 (e.g. Serial Peripheral Interface) to interface with peripherals, video codecs 1320 and Video interface 1325 to display and receive input (e.g. touch enabled input), GPU 1315 to perform graphics related computations, etc. Any of these interfaces may incorporate aspects of the implementations described herein.

In addition, the system illustrates peripherals for communication, such as a power control module 1355, a Bluetooth® module 1370, 3G modem 1375, GPS 1380, and Wi-Fi® 1385. Note as stated above, a UE includes a radio for communication. As a result, these peripheral communication modules may not all be included. However, in a UE some form of a radio for external communication should be included.

Figure 14:
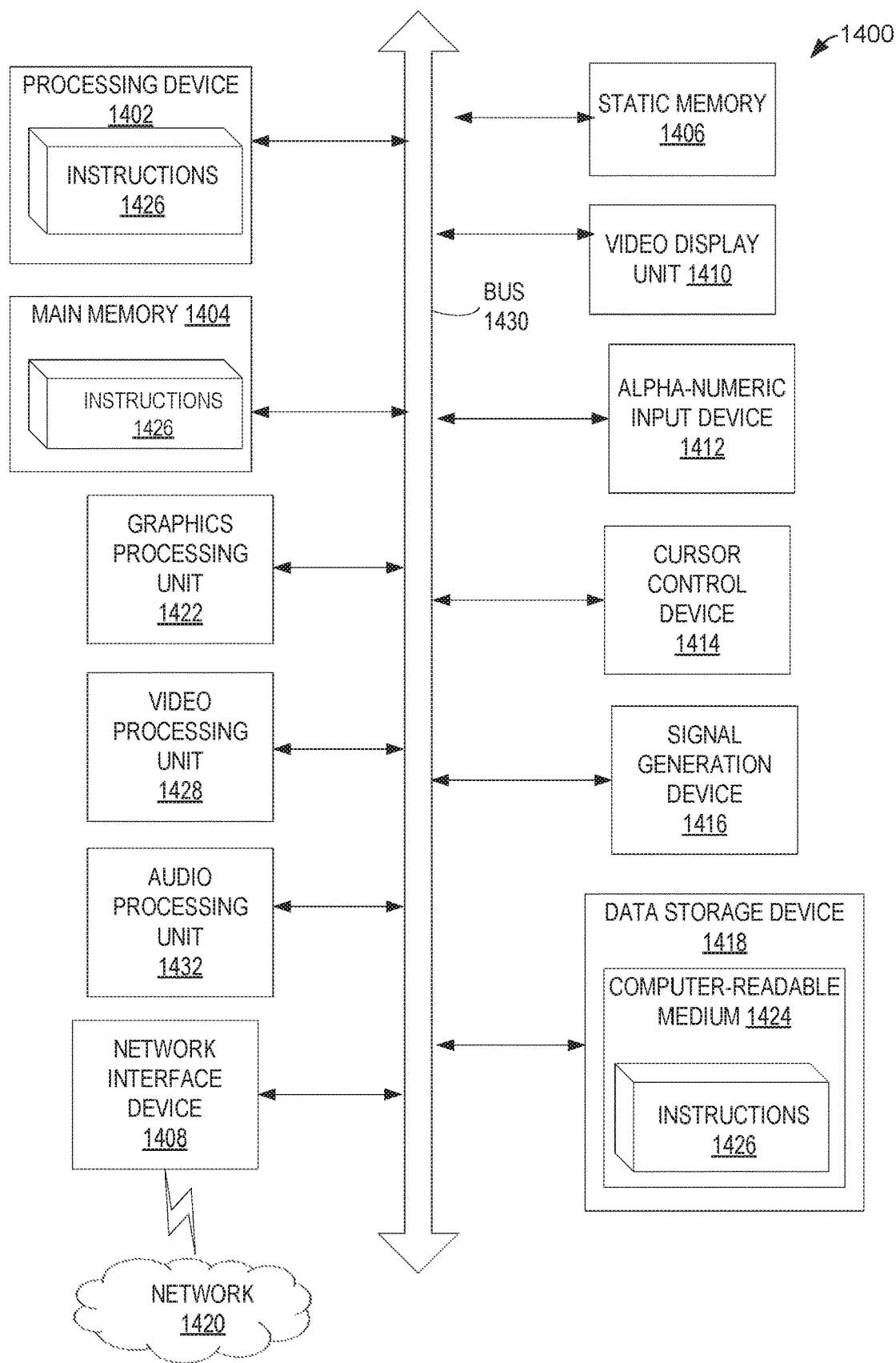
FIG. 14 illustrates another implementation of a block diagram for a computing system.

FIG. 14 illustrates a diagrammatic representation of a machine in the example form of a computing system 1400 within which a set of instructions, for causing the machine to implement hardware support for TD memory access checks using ownership bits tagged on cache lines according any one or more of the methodologies discussed herein. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The implementations of the page additions and content copying can be implemented in computing system 1400.

The computing system 1400 includes a processing device 1402, main memory 1404 (e.g., flash memory, dynamic random access memory (DRAM) (such as synchronous DRAM (SDRAM) or DRAM (RDRAM), etc.), a static memory 1406 (e.g., flash memory, static random access memory (SRAM), etc.), and a data storage device 1416, which communicate with each other via a bus 1408.

Processing device 1402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1402 may also be one or more special-purpose processing devices such as an application-specific integrated circuit (ASIC), a field programmable gate array (FPGA), a digital signal processor (DSP), network processor, or the like. In one implementation, processing device 1402 may include one or more processor cores. The processing device 1402 is configured to execute the processing logic 1426 for performing the operations discussed herein.

In one implementation, processing device 1402 can be part of a processor or an integrated circuit that includes the disclosed LLC caching architecture. Alternatively, the computing system 1400 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1400 may further include a network interface device 1418 communicably coupled to a network 1419. The computing system 1400 also may include a video display device 1410 (e.g., a liquid crystal display (LCD) or a cathode ray tube (CRT)), an alphanumeric input device 1412 (e.g., a keyboard), a cursor control device 1414 (e.g., a mouse), a signal generation device 1420 (e.g., a speaker), or other peripheral devices. Furthermore, computing system 1400 may include a graphics processing unit 1422, a video processing unit 1428 and an audio processing unit 1432. In another implementation, the computing system 1400 may include a chipset (not illustrated), which refers to a group of integrated circuits, or chips, that are designed to work with the processing device 1402 and controls communications between the processing device 1402 and external devices. For example, the chipset may be a set of chips on a motherboard that links the processing device 1402 to very high-speed devices, such as main memory 1404 and graphic controllers, as well as linking the processing device 1402 to lower-speed peripheral buses of peripherals, such as USB, PCI or ISA buses.

The data storage device 1416 may include a computer-readable storage medium 1424 on which is stored software 1426 embodying any one or more of the methodologies of functions described herein. The software 1426 may also reside, completely or at least partially, within the main memory 1404 as instructions 1426 and/or within the processing device 1402 as processing logic during execution thereof by the computing system 1400; the main memory 1404 and the processing device 1402 also constituting computer-readable storage media.

The computer-readable storage medium 1424 may also be used to store instructions 1426 utilizing the processing device 1402, and/or a software library containing methods that call the above applications. While the computer-readable storage medium 1424 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the disclosed implementations. The term "computer-readable storage medium" shall accordingly be taken to include, but not be limited to, solid-state memories, and optical and magnetic media.

The following examples pertain to further implementations.

Example 1 is a processor comprising: 1) a processor core; and 2) a memory controller coupled to the processor core, the memory controller comprising a cryptographic engine to: a) detect, within a write request for a cache line, a key identifier (ID) in a physical address of a location in memory; b) determine that the key ID is a trust domain key ID of a plurality of key IDs; c) responsive to a determination that the key ID is the trust domain key ID, set an ownership bit of the cache line to indicate the cache line belongs to a trust domain; d) encrypt the cache line to generate encrypted data; e) determine a message authentication code (MAC) associated with the cache line; and f) write the encrypted data, the ownership bit, and the MAC of the cache line to the memory.

In Example 2, the processor of Example 1, wherein the memory comprises a sequestered range to which is written the ownership bit in association with the cache line stored in the memory, the processor further comprising an on-die cache to cache the ownership bit for the processor core.

In Example 3, the processor of claim 1, wherein to determine the MAC, the cryptographic engine is further to apply a keyed hash algorithm over a combination of at least the encrypted data, an encrypted physical address, and the ownership bit.

In Example 4, the processor of claim 1, wherein the ownership bit is encoded with error correction code (ECC) bits of the cache line.

In Example 5, the processor of claim 4, wherein the cryptographic engine is further to generate an ECC calculation in conjunction with the write of the cache line to the memory, wherein the ownership bit is included within the ECC calculation.

In Example 6, the processor of claim 1, wherein, in response to a read request for the cache line, the cryptographic engine is further to: a) determine whether a second key ID within the read request is a trust domain key ID of the plurality of key IDs; and b) record an access type bit indicating whether the second key ID is a trust domain key ID.

In Example 7, the processor of claim 6, wherein the cryptographic engine is further to: a) determine that a value of the access type bit matches that of the ownership bit; b) verify integrity with respect to the MAC; and c) return, in response to the read request and in response to a MAC mismatch, a poison bit and invalid data that matches a fixed pattern.

In Example 8, the processor of claim 7, where the cryptographic engine is further to set a poison status bit in a key data structure of the cryptographic engine, the poison status bit being associated with the key ID.

In Example 9, the processor of claim 6, wherein the cryptographic engine is further to: a) determine that a value of the access type bit does not match that of the ownership bit; and b) return, in response to the read request, a poison bit and invalid data that matches a fixed pattern.

Various implementations may have different combinations of the structural features described above. For instance, all optional features of the processors and methods described above may also be implemented with respect to a system described herein and specifics in the examples may be used anywhere in one or more implementations.

Example 10 is a method comprising: 1) detecting, within a write request for a cache line by a memory controller of a processor, a key identifier (ID) in a physical address of a location in memory; 2) determining, by the memory controller, that the key ID is a trust domain key ID of a plurality of key IDs; 3) setting, by the memory controller responsive to determining that the key ID is the trust domain key ID, an ownership bit of the cache line to indicate the cache line belongs to a trust domain; 4) encrypting, by the memory controller, the cache line to generate encrypted data; 5) determining, by the memory controller, a message authentication code (MAC) associated with the cache line; and 6) writing, by the memory controller, the encrypted data, the ownership bit, and the MAC of the cache line to the memory.

In Example 11, the method of claim 10, wherein the memory comprises a sequestered range to which is written the ownership bit in association with the cache line stored in the memory, the method further comprising caching the ownership bit in on-die cache of the processor.

In Example 12, the method of claim 10, wherein determining the MAC comprises applying a keyed hash algorithm over a combination of at least the encrypted data, an encrypted physical address, and the ownership bit.

In Example 13, the method of claim 10, further comprising: 1) encoding the ownership bit within error correction code (ECC) bits of the cache line; and 2) generating an ECC calculation, in conjunction with writing the cache line to the memory, which includes the ownership bit.

In Example 14, the method of claim 10, wherein, in response to a read request for the cache line, further comprising: 1) determining whether a second key ID within the read request is a trust domain key ID of the plurality of the key IDs; and 2) recording an access type bit indicating whether the second key ID is a trust domain key ID.

In Example 15, the method of claim 14, further comprising: 1) determining that a value of the access type bit matches that of the ownership bit; 2) verifying integrity with respect to the MAC; and 3) returning, in response to the read request and in response to a MAC mismatch, a poison bit and invalid data that matches a fixed pattern.

In Example 16, the method of claim 15, further comprising setting a poison status bit in a key data structure of the memory controller, the poison status bit being associated with the key ID.

In Example 17, the method of claim 14, further comprising: 1) determining that a value of the access type bit does not match that of the ownership bit; and 2) returning, in response to the read request, a poison bit and invalid data that matches a fixed pattern.

Various implementations may have different combinations of the structural features described above. For instance, all optional features of the processors and methods described above may also be implemented with respect to a system described herein and specifics in the examples may be used anywhere in one or more implementations.

Example 18 is a system comprising: 1) a memory device to store cache lines and associated ownership bits; 2) a processor core; and 3) a memory controller coupled between the memory device and the processor core, wherein the memory controller comprises a cryptographic engine to: a) detect, within a read request for a cache line from the processor core, a key identifier (ID) within a physical address of a location in the memory device; b) determine that the key ID is a trust domain key ID of a plurality of key IDs; c) read the cache line from the memory; and d) determine whether an ownership bit, stored in the memory device for the cache line, is set to indicate the cache line belongs to a trust domain.

In Example 19, the system of Example 18, wherein the cryptographic engine is further to: a) record an access type bit indicating whether the key ID is the trust domain key ID; and b) determine whether a value of the access type bit matches that of the ownership bit.

In Example 20, the system of claim 19, wherein, in response to a determination that the value of the access type bit matches that of the ownership bit, the cryptographic engine is further to: a) determine that a poison status bit, associated with the key ID in a key data structure, is set; and b) return, in response to the read request, a poison bit and invalid data that matches a fixed pattern.

In Example 21, the system of claim 19, wherein, in response to a determination that the value of the access type bit matches that of the ownership bit, the cryptographic engine is further to: a) determine that a poison status bit, associated with the key ID in a key data structure, is not set; b) verify integrity with respect to a message authentication code (MAC) stored with the cache line; and c) return, in response to the read request and in response to a MAC mismatch, a poison bit and invalid data that matches a fixed pattern.

In Example 22, the system of example 21, wherein the cryptographic engine is further to: a) determine that key poisoning is enabled; and b) set a poison status bit associated with the key ID in a key data structure, to indicate the key ID is invalid.

Various implementations may have different combinations of the structural features described above. For instance, all optional features of the processors and methods described above may also be implemented with respect to a system described herein and specifics in the examples may be used anywhere in one or more implementations.

Example 23 is a non-transitory computer-readable medium storing instructions, which when executed by a processor having a core coupled to a system memory, cause the processor to execute a plurality of logic operations comprising: 1) detecting, within a write request for a cache line by a memory controller of a processor, a key identifier (ID) in a physical address of a location in memory; 2) determining, by the memory controller, that the key ID is a trust domain key ID of a plurality of key IDs; 3) setting, by the memory controller responsive to determining that the key ID is the trust domain key ID, an ownership bit of the cache line to indicate the cache line belongs to a trust domain; 4) encrypting, by the memory controller, the cache line to generate encrypted data; 5) determining, by the memory controller, a message authentication code (MAC) associated with the cache line; and 6) writing, by the memory controller, the encrypted data, the ownership bit, and the MAC of the cache line to the memory.

In Example 24, the non-transitory computer-readable medium of example 23, wherein the memory comprises a sequestered range to which is written the ownership bit in association with the cache line stored in the memory, the plurality of logic operations comprising further comprising caching the ownership bit in on-die cache of the processor.

In Example 25, the non-transitory computer-readable medium of example 23, wherein determining the MAC comprises applying a keyed hash algorithm over a combination of at least the encrypted data, an encrypted physical address, and the ownership bit.

In Example 26, the non-transitory computer-readable medium of example 23, wherein the plurality of logic operations comprises: 1) encoding the ownership bit within error correction code (ECC) bits of the cache line; and 2) generating an ECC calculation, in conjunction with writing the cache line to the memory, which includes the ownership bit.

In Example 27, the non-transitory computer-readable medium of example 23, wherein, in response to a read request for the cache line, the plurality of logic operations comprising further comprising: 1) determining whether a second key ID within the read request is a trust domain key ID of the plurality of the key IDs; and 2) recording an access type bit indicating whether the second key ID is a trust domain key ID.

In Example 28, the non-transitory computer-readable medium of example 27, wherein the plurality of logic operations comprising: 1) determining that a value of the access type bit matches that of the ownership bit; 2) verifying integrity with respect to the MAC; and 3) returning, in response to the read request and in response to a MAC mismatch, a poison bit and invalid data that matches a fixed pattern.

In Example 29, the non-transitory computer-readable medium of example 28, wherein the plurality of logic operations comprising further comprising setting a poison status bit in a key data structure of the memory controller, the poison status bit being associated with the key ID.

In Example 30, the non-transitory computer-readable medium of example 27, wherein the plurality of logic operations comprising further comprising: 1) determining that a value of the access type bit does not match that of the ownership bit; and 2) returning, in response to the read request, a poison bit and invalid data that matches a fixed pattern.

Various implementations may have different combinations of the structural features described above. For instance, all optional features of the processors and methods described above may also be implemented with respect to a system described herein and specifics in the examples may be used anywhere in one or more implementations.

Example 31 is a system comprising: 1) means for detecting, within a write request for a cache line, a key identifier (ID) in a physical address of a location in memory; 2) means for determining that the key ID is a trust domain key ID of a plurality of key IDs; 3) means for setting, responsive to determining that the key ID is the trust domain key ID, an ownership bit of the cache line to indicate the cache line belongs to a trust domain; 4) means for encrypting the cache line to generate encrypted data; 5) means for determining a message authentication code (MAC) associated with the cache line; and 6) means for writing the encrypted data, the ownership bit, and the MAC of the cache line to the memory.

In Example 32, the system of example 31, wherein the memory comprises a sequestered range to which is written the ownership bit in association with the cache line stored in the memory, further comprising means for caching the ownership bit in on-die cache of the processor.

In Example 33, the system of example 31, wherein means for determining the MAC comprises means for applying a keyed hash algorithm over a combination of at least the encrypted data, an encrypted physical address, and the ownership bit.

In Example 34, the system of example 31, further comprising: 1) means for encoding the ownership bit within error correction code (ECC) bits of the cache line; and 2) means for generating an ECC calculation, in conjunction with writing the cache line to the memory, which includes the ownership bit.

In Example 35, the system of example 31, wherein, in response to a read request for the cache line, further comprising: 1) means for determining whether a second key ID within the read request is a trust domain key ID of the plurality of the key IDs; and 2) means for recording an access type bit indicating whether the second key ID is a trust domain key ID.

In Example 36, the system of example 31, further comprising: 1) means for determining that a value of the access type bit matches that of the ownership bit; 2) means for verifying integrity with respect to the MAC; and 3) means for returning, in response to the read request and in response to a MAC mismatch, a poison bit and invalid data that matches a fixed pattern.

In Example 37, the system of example 36, further comprising means for setting a poison status bit in a key data structure of the memory controller, the poison status bit being associated with the key ID.

In Example 38, the system of example 31, further comprising: 1) means for determining that a value of the access type bit does not match that of the ownership bit; and 2) means for returning, in response to the read request, a poison bit and invalid data that matches a fixed pattern.

While the disclosure has been described with respect to a limited number of implementations, those skilled in the art will appreciate numerous modifications and variations there-from. It is intended that the appended claims cover all such modifications and variations as fall within the true spirit and scope of this disclosure.

In the description herein, numerous specific details are set forth, such as examples of specific types of processing devices and system configurations, specific hardware structures, specific architectural and micro architectural details, specific register configurations, specific instruction types, specific system components, specific measurements/heights, specific processing device pipeline stages and operation etc. in order to provide a thorough understanding of the disclosure. It will be apparent, however, to one skilled in the art that these specific details need not be employed to practice the disclosure. In other instances, well known components or methods, such as specific and alternative processing device architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the disclosure.

The implementations are described with reference to providing co-existence of trust domain architecture with multi-key total memory encryption technology in virtualized systems using trust domains in specific integrated circuits, such as in computing platforms or microprocessing devices. The implementations may also be applicable to other types of integrated circuits and programmable logic devices. For example, the disclosed implementations are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processing device (DSP), a system on a chip, network computers (NetPC), set-top boxes, network hubs, wide area network (WAN) switches, or any other system that may perform the functions and operations taught below. It is described that the system may be any kind of computer or embedded system. The disclosed implementations may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the implementations of methods, apparatuses, and systems described herein (whether in reference to hardware, firmware, software, or a combination thereof) are vital to a 'green technology' future balanced with performance considerations.

Although the implementations herein are described with reference to a processing device, other implementations are applicable to other types of integrated circuits and logic devices. Similar techniques and teachings of implementations of the disclosure may be applied to other types of circuits or semiconductor devices that may benefit from higher pipeline throughput and improved performance. The teachings of implementations of the disclosure are applicable to any processing device or machine that performs data manipulations. However, the disclosure is not limited to processing devices or machines that perform 512 bit, 256 bit, 128 bit, 64 bit, 32 bit, or 16 bit data operations and may be applied to any processing device and machine in which manipulation or management of data is performed. In addition, the description herein provides examples, and the accompanying drawings show various examples for the purposes of illustration. However, these examples should not be construed in a limiting sense as they are merely intended to provide examples of implementations of the disclosure rather than to provide an exhaustive list of all possible implementations of implementations of the disclosure.

Although the below examples describe instruction handling and distribution in the context of execution units and logic circuits, other implementations of the disclosure may be accomplished by way of a data or instructions stored on a machine-readable, tangible medium, which when performed by a machine cause the machine to perform functions consistent with at least one implementation of the disclosure. In one implementation, functions associated with implementations of the disclosure are embodied in machine-executable instructions. The instructions may be used to cause a general-purpose or special-purpose processing device that is programmed with the instructions to perform the steps of the disclosure. Implementations of the disclosure may be provided as a computer program product or software which may include a machine or computer-readable medium having stored thereon instructions which may be used to program a computer (or other electronic devices) to perform one or more operations according to implementations of the disclosure. Alternatively, operations of implementations of the disclosure might be performed by specific hardware components that contain fixed-function logic for performing the operations, or by any combination of programmed computer components and fixed-function hardware components.

Instructions used to program logic to perform implementations of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as may be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one implementation, refers to some apparatus, logic, hardware, and/or element designed in such a way to enable use of the apparatus, logic, hardware, and/or element in a specified manner. Note as above that use of to, capable to, or operable to, in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from. Instructions used to program logic to perform implementations of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other exemplarily language does not necessarily refer to the same implementation or the same example, but may refer to different and distinct implementations, as well as potentially the same implementation.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A method comprising:
  detecting, within a write request for a cache line by a memory controller of a processor, a key identifier (ID) in a physical address of a location in memory;
  determining, by the memory controller, whether the key ID is a trust domain key ID or a non-trust domain key ID of a plurality of key IDs;
  setting, by the memory controller responsive to determining that the key ID is the trust domain key ID, an ownership bit of the cache line to indicate the cache line belongs to a trust domain, otherwise not setting the ownership bit of the cache line;
  encrypting, by the memory controller, the cache line to generate encrypted data;
  determining, by the memory controller, a message authentication code (MAC) associated with the cache line, wherein the MAC is determined based on at least the physical address and the ownership bit;
  writing, by the memory controller, the encrypted data, the ownership bit, and the MAC of the cache line to the memory;
  in response to a read request for the cache line, determining whether a second key ID within the read request is a trust domain key ID of the plurality of key IDs, and recording an access type bit indicating whether the second key ID is a trust domain key ID.

2. The method of claim 1, wherein the memory comprises a sequestered range to which is written the ownership bit in association with the cache line stored in the memory, the method further comprising caching the ownership bit in on-die cache of the processor.

3. The method of claim 1, wherein determining the MAC comprises applying a keyed hash algorithm over a combination of at least the encrypted data, an encrypted physical address, and the ownership bit.

4. The method of claim 1, further comprising:
  encoding the ownership bit within error correction code (ECC) bits of the cache line; and
  generating an ECC calculation, in conjunction with writing the cache line to the memory, which includes the ownership bit.

5. The method of claim 1, further comprising:
  determining that a value of the access type bit matches that of the ownership bit;

verifying integrity with respect to the MAC; and returning, in response to the read request and in response to a MAC mismatch, a poison bit and invalid data that matches a fixed pattern.

6. The method of claim 5, further comprising setting a poison status bit in a key data structure of the memory controller, the poison status bit being associated with the key ID.

7. The method of claim 1, further comprising:

determining that a value of the access type bit does not match that of the ownership bit; and returning, in response to the read request, a poison bit and invalid data that matches a fixed pattern.

8. A processor comprising:

a processor core; and a memory controller coupled to the processor core, the memory controller comprising a cryptographic engine to:

detect, within a write request for a cache line, a key identifier (ID) in a physical address of a location in memory;

determine whether the key ID is a trust domain key ID or a non-trust domain key ID of a plurality of key IDs;

responsive to a determination that the key ID is the trust domain key ID, set an ownership bit of the cache line to indicate the cache line belongs to a trust domain, otherwise not set the ownership bit of the cache line;

encrypt the cache line to generate encrypted data;

determine a message authentication code (MAC) associated with the cache line, wherein the MAC is determined based on at least the physical address and the ownership bit;

write the encrypted data, the ownership bit, and the MAC of the cache line to the memory, and in response to a read request for the cache line, determine whether a second key ID within the read request is a trust domain key ID of the plurality of key IDs, and record an access type bit indicating whether the second key ID is a trust domain key ID.

9. The processor of claim 8, wherein the memory comprises a sequestered range to which is written the ownership bit in association with the cache line stored in the memory, the processor further comprising an on-die cache to cache the ownership bit for the processor core.

10. The processor of claim 8, wherein to determine the MAC, the cryptographic engine is further to apply a keyed hash algorithm over a combination of at least the encrypted data, an encrypted physical address, and the ownership bit.

11. The processor of claim 8, wherein the ownership bit is encoded with error correction code (ECC) bits of the cache line.

12. The processor of claim 11, wherein the cryptographic engine is further to generate an ECC calculation in conjunction with the write of the cache line to the memory, wherein the ownership bit is included within the ECC calculation.

13. The processor of claim 8, wherein the cryptographic engine is further to:

determine that a value of the access type bit matches that of the ownership bit;

verify integrity with respect to the MAC; and return, in response to the read request and in response to a MAC mismatch, a poison bit and invalid data that matches a fixed pattern.

14. The processor of claim 13, wherein the cryptographic engine is further to set a poison status bit in a key data structure of the cryptographic engine, the poison status bit being associated with the key ID.

15. The processor of claim 8, wherein the cryptographic engine is further to:

determine that a value of the access type bit does not match that of the ownership bit; and return, in response to the read request, a poison bit and invalid data that matches a fixed pattern.

16. A system comprising:

a memory device to store cache lines and associated ownership bits;

a processor core; and a memory controller coupled between the memory device and the processor core, wherein the memory controller comprises a cryptographic engine to:

detect, within a read request for a cache line from the processor core, a key identifier (ID) within a physical address of a location in the memory device;

determine whether the key ID is a trust domain key ID or a non-trust domain key ID of a plurality of key IDs;

setting an access type bit indicating whether the key ID is the trust domain key ID or non-trust domain key ID;

read the cache line from the memory device;

determine whether an ownership bit, stored in the memory device for the cache line, is set to indicate the cache line belongs to a trust domain; and verify integrity with respect to a message authentication code (MAC) associated with the cache line, wherein the MAC is verified based on at least the physical address and the ownership bit.

17. The system of claim 16, wherein the cryptographic engine is further to:

determine whether a value of the access type bit matches that of the ownership bit.

18. The system of claim 17, wherein, in response to a determination that the value of the access type bit matches that of the ownership bit, the cryptographic engine is further to:

determine that a poison status bit, associated with the key ID in a key data structure, is set; and return, in response to the read request, a poison bit and invalid data that matches a fixed pattern.

19. The system of claim 17, wherein, in response to a determination that the value of the access type bit matches that of the ownership bit, the cryptographic engine is further to:

determine that a poison status bit, associated with the key ID in a key data structure, is not set;

verify integrity with respect to a message authentication code (MAC) stored with the cache line; and return, in response to the read request and in response to a MAC mismatch, a poison bit and invalid data that matches a fixed pattern.

20. The system of claim 19, wherein the cryptographic engine is further to:

determine that key poisoning is enabled; and set a poison status bit associated with the key ID in a key data structure, to indicate the key ID is invalid.

* * * * *